US012648043B2

(12) United States Patent (10) Patent No.: US 12,648,043 B2
Yan et al. (45) Date of Patent: Jun. 2, 2026

(54) COMMUNICATION METHOD, APPARATUS, AND SYSTEM

(71) Applicant: Huawei Technologies Co., Ltd., Shenzhen (CN)

(72) Inventors: Le Yan, Shenzhen (CN); Tingting Geng, Shanghai (CN); Xingxing Hu, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 606 days.

(21) Appl. No.: 17/738,233

(22) Filed: May 6, 2022

(65) Prior Publication Data

US 2022/0264401 A1 Aug. 18, 2022

Related U.S. Application Data

(63) Continuation of application No. PCT/CN2019/116868, filed on Nov. 8, 2019.

(51) Int. Cl.
| *H04W 76/20* | (2018.01) |
| *H04W 36/00* | (2009.01) |
| *H04W 36/30* | (2009.01) |
| *H04W 36/36* | (2009.01) |

(52) U.S. Cl.
CPC ....... *H04W 76/20* (2018.02); *H04W 36/0061* (2013.01); *H04W 36/0083* (2013.01); *H04W 36/305* (2018.08); *H04W 36/362* (2023.05)

(58) Field of Classification Search
CPC ........... H04W 36/0061; H04W 36/305; H04W 36/0083; H04W 36/362; H04W 36/0079; H04W 36/08; H04W 76/20; H04W 76/18; H04W 24/02
See application file for complete search history.

(56) References Cited

U.S. PATENT DOCUMENTS

2014/0148174 A1 5/2014 Teyeb et al.

FOREIGN PATENT DOCUMENTS

| CN | 107113673 A | 8/2017 |
| CN | 110278574 A | 9/2019 |
| CN | 110366212 A | 10/2019 |
| WO | 2014163553 A1 | 10/2014 |
| WO | 2019175463 A1 | 9/2019 |
| WO | WO-2021057702 A1 * | 4/2021 |

OTHER PUBLICATIONS

Chang N, WO2021057702A1_Translated, 2021 (Year: 2021).*

(Continued)

*Primary Examiner* — Peter Chen
*Assistant Examiner* — Jia Hao Deng
(74) *Attorney, Agent, or Firm* — Slater Matsil, LLP

(57) ABSTRACT

A communication method, apparatus, and system, the method including receiving first indication information from a first network device, where the first indication information is requests a terminal device to report first information, and reporting the first information to the first network device, where the first information includes related information in a conditional handover procedure.

25 Claims, 3 Drawing Sheets

(56) References Cited

OTHER PUBLICATIONS

"Discussion on RLF reporting for SON," Agenda Item: 11.12.4, SON, Source: Huawei, HiSilicon, Document for. Discussion and Decision, 3GPP TSG-RAN WG2 Meeting#107, R2-1909738, Prague, Czech Republic, Aug. 26-30, 2019, 6 pages.
"On RLF reporting for CHO and DAPS," Agenda item: 6.9.3.2, Source: Nokia, Nokia Shanghai Bell, WID/SID: NR_Mob_enh-Core—Release 16, Document for: Discussion and Decision, 3GPP TSG-RAN WG2 Meeting #108, R2-1915497, Reno, USA, Nov. 18-22, 2019, 3 pages.

* cited by examiner

COMMUNICATION METHOD, APPARATUS, AND SYSTEM

CROSS-REFERENCE TO RELATED APPLICATIONS

This application is a continuation of an International Application No. PCT/CN2019/116868, filed on Nov. 8, 2019, the disclosure of which is hereby incorporated by reference in its entirety.

TECHNICAL FIELD

This application relates to the field of mobile communication technologies, and in particular, to a communication method, apparatus, and system.

BACKGROUND

In a conventional handover mechanism, a network device sends, to a terminal device, a handover message that includes configuration information of a target cell, so that the terminal device attempts to access or hand over to the target cell based on the configuration information. In conventional handover, successful sending of the handover message is a necessary condition for ensuring successful handover in the conventional handover mechanism. However, the handover message may fail to be sent due to fast attenuation of channel quality, fast movement of the terminal device, blocking of an object, or long duration of measurement or handover preparation. Consequently, a handover failure is caused, and a handover success rate is reduced.

In view of the above problems existing in the conventional handover, a conditional handover mechanism is proposed to improve a handover success rate and handover robustness. In the conditional handover mechanism, a network device sends configuration information of at least one candidate cell to a terminal device, so that the terminal device determines a target cell based on the configuration information, and attempts to access or hand over to the target cell, where the target cell belongs to the at least one candidate cell.

Regardless of whether the conventional handover mechanism or the conditional handover mechanism is used, a handover parameter (for example, the configuration information of the target cell or the configuration information of the at least one candidate cell) is always one of key factors that affect success rates of the conventional handover and the conditional handover. To optimize the handover parameter in the conventional handover mechanism, a mobility robustness optimization (MRO) mechanism is introduced. To be specific, the terminal device reports related information in a conventional handover process, and then the network device can optimize the handover parameter based on the related information reported by the terminal device.

The current mobility robustness optimization mechanism applies only to the conditional handover mechanism, and there is no corresponding mobility robustness optimization mechanism for the conditional handover mechanism currently.

SUMMARY

This application provides a communication method, apparatus, and system, to report recorded related information in a conditional handover procedure, thereby improving system reliability and robustness.

According to a first aspect, this application provides a communication method, including: receiving first indication information from a first network device, where the first indication information is used to request a terminal device to report first information, and reporting the first information to the first network device, where when a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device successfully accesses the first cell, the first information includes one or more of the following: identification information of the first cell, index information corresponding to the first cell, signal quality corresponding to the first cell when the terminal device successfully accesses the first cell, a success cause value, or indication information for indicating that the first cell meets a cell selection criterion and the access succeeds. The first cell belongs to the first network device, the at least one candidate cell is indicated by a radio resource control (RRC) reconfiguration message from a second network device, the second network device is a network device to which the source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the receiving first indication information from a first network device, the method further includes: receiving indication information for indicating to record the first information. The indication information may be referred to as second indication information. The second indication information may be from second network device.

In a possible implementation method, before the receiving first indication information from a first network device, the method further includes: sending, to the first network device, indication information for indicating that the recording of the first information has been completed. The indication information may be referred to as third indication information. The third indication information may be sent to the first network device.

Optionally, the second indication information may be included in the RRC reconfiguration message (where the RRC reconfiguration message may be an RRC message including conditional handover (CHO) configuration information or an RRC message (namely, a handover message) for conventional handover). The user equipment UE may include, in an RRC reconfiguration complete message sent to the network device to which the successfully accessed first cell belongs, recorded related information (that is, a part or all of the first information) in a corresponding scenario. Optionally, the RRC reconfiguration complete message may further include the third indication information.

According to a second aspect, this application provides a communication method, including: receiving first indication information from a first network device, where the first indication information is used to request a terminal device to report first information, and reporting the first information to the first network device, where when the terminal device determines, after receiving an RRC message that includes conditional handover configuration information, a first candidate cell that meets a conditional handover execution condition, and the terminal device successfully accesses the first candidate cell, the first information includes one or more of the following: identification information of the first candidate cell, index information corresponding to the first candidate cell, signal quality corresponding to the first candidate cell when the terminal device successfully accesses the first candidate cell, a success cause value, indication information for indicating that the first candidate cell meets the conditional handover execution condition and the access succeeds, or signal quality corresponding to some or all candidate cells other than the first candidate cell in at least one candidate cell when the terminal device successfully accesses the first candidate cell. The first network device is a network device to which the first candidate cell belongs, the at least one candidate cell is indicated by an RRC reconfiguration message from a second network device, the second network device is a network device to which a source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the receiving first indication information from a first network device, the method further includes: receiving indication information for indicating to record the first information. The indication information may be referred to as second indication information. The second indication information may be from the second network device.

In a possible implementation method, before the receiving first indication information from a first network device, the method further includes: sending, to the first network device, indication information for indicating that the recording of the first information has been completed. The indication information may be referred to as third indication information. The third indication information may be sent to the first network device.

Optionally, the second indication information may be included in the RRC reconfiguration message (where the RRC reconfiguration message may be an RRC message including CHO configuration information or an RRC message (namely, a handover message) for conventional handover). The UE may include, in an RRC reconfiguration complete message sent to the network device to which the successfully accessed first cell belongs, recorded related information (that is, a part or all of the first information) in a corresponding scenario. Optionally, the RRC reconfiguration complete message may further include the third indication information.

According to a third aspect, this application provides a communication method, including: receiving first indication information from a first network device, where the first indication information is used to request a terminal device to report first information, and reporting the first information to the first network device, where when a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device fails to access the first cell, the first information includes one or more of the following: identification information of the first cell, index information corresponding to the first cell, conditional handover configuration information corresponding to the first cell, signal quality corresponding to the first cell when the terminal device fails to access the first cell, a failure cause value, or indication information for indicating that the first cell meets a cell selection criterion and the access fails. The first network device is a network device to which a re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the receiving first indication information from a first network device, the method further includes: receiving indication information for indicating to record the first information. The indication information may be referred to as second indication information. The second indication information may be from the second network device. In a possible implementation method, before the receiving first indication information from a first network device, the method further includes: sending, to the first network device, indication information for indicating that the recording of the first information has been completed. The indication information may be referred to as third indication information. The third indication information may be sent to the first network device.

Optionally, the second indication information may be included in the RRC reconfiguration message (where the RRC reconfiguration message may be an RRC message including CHO configuration information or an RRC message (namely, a handover message) for conventional handover). If re-establishment succeeds, the first network device may be the network device to which the re-establishment cell belongs, and the UE may include, in an RRC re-establishment complete message sent to the network device to which the re-establishment cell belongs, recorded related information (that is, a part or all of the first information) in a corresponding scenario. Optionally, the RRC re-establishment complete message may further include the third indication information. If re-establishment fails, the first network device may be the network device to which the cell in the RRC establishment process belongs, and the UE may include, in an RRC establishment complete message sent to the network device to which the cell in the RRC establishment process belongs, recorded related information (that is, a part or all of the first information) in a corresponding scenario. Optionally, the RRC establishment complete message may further include the third indication information.

According to a fourth aspect, this application provides a communication method, including: receiving first indication information from a first network device, where the first indication information is used to request a terminal device to report first information, and reporting the first information to the first network device, where when a radio link failure occurs in a source cell of the terminal device, conventional handover fails, or the terminal device fails to access a first candidate cell that meets a conditional handover execution condition, and a cell selected by performing cell selection does not belong to at least one candidate cell, the first information includes one or more of the following: cell identification information of a re-establishment cell, signal quality corresponding to the re-establishment cell when a re-establishment procedure is performed, a re-establishment cause value, indication information for indicating that the cell selected by the terminal device by performing cell selection meets a cell selection criterion but does not belong to the at least one candidate cell, or signal quality corresponding to some or all candidate cells in the at least one candidate cell when the terminal device performs the re-establishment procedure. The first network device is a network device to which the re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the receiving first indication information from a first network device, the method further includes: receiving indication information for indicating to record the first information. The indication information may be referred to as second indication information. The second indication information may be from the second network device.

In a possible implementation method, before the receiving first indication information from a first network device, the method further includes: sending, to the first network device, indication information for indicating that the recording of the first information has been completed. The indication information may be referred to as third indication information. The third indication information may be sent to the first network device.

Optionally, the second indication information may be included in the RRC reconfiguration message (where the RRC reconfiguration message may be an RRC message including CHO configuration information or an RRC message (namely, a handover message) for conventional handover). If re-establishment succeeds, the first network device may be the network device to which the re-establishment cell belongs, and the UE may include, in an RRC re-establishment complete message sent to the network device to which the re-establishment cell belongs, recorded related information (that is, a part or all of the first information) in a corresponding scenario. Optionally, the RRC re-establishment complete message may further include the third indication information. If re-establishment fails, the first network device may be the network device to which the cell in the RRC establishment process belongs, and the UE may include, in an RRC establishment complete message sent to the network device to which the cell in the RRC establishment process belongs, recorded related information (that is, a part or all of the first information) in a corresponding scenario. Optionally, the RRC establishment complete message may further include the third indication information.

According to a fifth aspect, this application provides a communication method, including: sending, by a first network device, first indication information to a terminal device, where the first indication information is used to request the terminal device to report first information, and receiving, by the first network device, the first information from the terminal device, where when a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device successfully accesses the first cell, the first information includes one or more of the following: identification information of the first cell, index information corresponding to the first cell, signal quality corresponding to the first cell when the terminal device successfully accesses the first cell, a success cause value, or indication information for indicating that the first cell meets a cell selection criterion and the access succeeds. The first cell belongs to the first network device, the at least one candidate cell is indicated by an RRC reconfiguration message from a second network device, the second network device is a network device to which the source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the sending first indication information to a terminal device, the method further includes: receiving, from the terminal device, indication information for indicating that recording of the first information has been completed.

According to a sixth aspect, this application provides a communication method, including: sending, by a first network device, first indication information to a terminal device, where the first indication information is used to request the terminal device to report first information, and receiving, by the first network device, the first information from the terminal device, where when the terminal device determines, after receiving an RRC message that includes conditional handover configuration information, a first candidate cell that meets a conditional handover execution condition, and the terminal device successfully accesses the first candidate cell, the first information includes one or more of the following: identification information of the first candidate cell, index information corresponding to the first candidate cell, signal quality corresponding to the first candidate cell when the terminal device successfully accesses the first candidate cell, a success cause value, indication information for indicating that the first candidate cell meets the conditional handover execution condition and the access succeeds, or signal quality corresponding to some or all candidate cells other than the first candidate cell in at least one candidate cell when the terminal device successfully accesses the first candidate cell. The first network device is a network device to which the first candidate cell belongs, the at least one candidate cell is indicated by an RRC reconfiguration message from a second network device, the second network device is a network device to which a source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the sending first indication information to a terminal device, the method further includes: receiving, from the terminal device, indication information for indicating that recording of the first information has been completed.

According to a seventh aspect, this application provides a communication method, including: sending, by a first network device, first indication information to a terminal device, where the first indication information is used to request the terminal device to report first information, and receiving, by the first network device, the first information from the terminal device, where when a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device fails to access the first cell, the first information includes one or more of the following: identification information of the first cell, index information corresponding to the first cell, conditional handover configuration information corresponding to the first cell, signal quality corresponding to the first cell when the terminal device fails to access the first cell, a failure cause value, or indication information for indicating that the first cell meets a cell selection criterion and the access fails. The first network device is a network device to which a re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the sending first indication information to a terminal device, the method further includes: receiving, from the terminal device, indication information for indicating that recording of the first information has been completed.

According to an eighth aspect, this application provides a communication method, including: sending, by a first network device, first indication information to a terminal device, where the first indication information is used to request the terminal device to report first information, and receiving, by the first network device, the first information from the terminal device, where when a radio link failure occurs in a source cell of the terminal device, conventional handover fails, or the terminal device fails to access a first candidate cell that meets a conditional handover execution condition, and a cell selected by performing cell selection does not belong to at least one candidate cell, the first information includes one or more of the following: cell identification information of a re-establishment cell, signal quality corresponding to the re-establishment cell when a re-establishment procedure is performed, a re-establishment cause value, indication information for indicating that the cell selected by the terminal device by performing cell selection meets a cell selection criterion but does not belong to the at least one candidate cell, or signal quality corresponding to some or all candidate cells in the at least one candidate cell when the terminal device performs the re-establishment procedure. The first network device is a network device to which the re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

Based on the foregoing solution, the terminal device may report the recorded related information in the conditional handover procedure to the first network device, so that the first network device or another network device can adjust a handover parameter (for example, conventional handover configuration information or conditional handover configuration information) based on the obtained related information, thereby improving system reliability and robustness.

In a possible implementation method, before the sending first indication information to a terminal device, the method further includes: receiving, from the terminal device, indication information for indicating that recording of the first information has been completed.

Based on the first aspect, any implementation method of the first aspect, the fifth aspect, or any implementation method of the fifth aspect, the following implementation method is further provided:

In a possible implementation method, when the radio link failure occurs in the source cell of the terminal device, the conventional handover fails, or the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: signal quality corresponding to some or all candidate cells in the at least one candidate cell when the terminal device determines the first cell, or signal quality corresponding to some or all candidate cells other than the first cell in the at least one candidate cell when the terminal device successfully accesses the first cell.

In a possible implementation method, when the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: signal quality corresponding to some or all candidate cells in the at least one candidate cell when the conditional handover execution condition corresponding to the first candidate cell is met, or signal quality corresponding to some or all candidate cells in the at least one candidate cell when the terminal device fails to access the first candidate cell.

In a possible implementation method, when the radio link failure occurs in the source cell of the terminal device, the first cell selected by the terminal device by performing cell selection belongs to the at least one candidate cell, and the terminal device successfully accesses the first cell, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines the first cell, a time period 3, where the time period 3 is a time period from the time point at which the terminal device determines the first cell to a time point at which the terminal device successfully accesses the first cell, a time period 4, where the time period 4 is a time period from the time point at which the terminal device successfully accesses the first cell to a time point at which the terminal device reports the time period 4, or a time period including any two or more consecutive time periods in the time period 1 to the time period 4.

In a possible implementation method, when the conventional handover fails, the first cell selected by the terminal device by performing cell selection belongs to the at least one candidate cell, and the terminal device successfully accesses the first cell, the first information further includes one or more of the following: a time period 5, where the time period 5 is a time period from a time point at which the terminal device receives the RRC reconfiguration message to a time point at which the terminal device receives a conventional handover message, a time period 6, where the time period 6 is a time period from the time point at which the terminal device receives the conventional handover message to a time point at which the conventional handover fails, a time period 7, where the time period 7 is a time period from the time point at which the conventional handover fails to a time point at which the terminal device determines the first cell, a time period 8, where the time period 8 is a time period from the time point at which the terminal device determines the first cell to a time point at which the terminal device successfully accesses the first cell, a time period 9, where the time period 9 is a time period from the time point at which the terminal device successfully accesses the first cell to a time point at which the terminal device reports the time period 9, or a time period including any two or more consecutive time periods in the time period 5 to the time period 9.

In a possible implementation method, when the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: a time period 10, where the time period 10 is a time period from a time point at which the terminal device receives the RRC reconfiguration message to a time point at which the terminal device determines the first candidate cell that meets the conditional handover execution condition, a time period 11, where the time period 11 is a time period from the time point at which the terminal device determines the first candidate cell that meets the conditional handover execution condition to a time point at which the terminal device fails to access the first candidate cell, a time period 12, where the time period 12 is a time period from the time point at which the terminal device fails to access the first candidate cell to a time point at which the terminal device determines the first cell, a time period 13, where the time period 13 is a time period from the time point at which the terminal device determines the first cell to a time point at which the terminal device successfully accesses the first cell, a time period 14, where the time period 14 is a time period from the time point at which the terminal device successfully accesses the first cell to a time point at which the terminal device reports the time period 14, or a time period including any two or more consecutive time periods in the time period 10 to the time period 14.

Based on the second aspect, any implementation method of the second aspect, the sixth aspect, or any implementation method of the sixth aspect, the following implementation method is further provided:

In a possible implementation method, when the terminal device determines, after receiving an RRC message that includes conditional handover configuration information, a first candidate cell that meets a conditional handover execution condition, and the terminal device successfully accesses the first candidate cell, the first information includes one or more of the following: identification information of the first candidate cell, index information corresponding to the first candidate cell, signal quality corresponding to the first candidate cell when the terminal device successfully accesses the first candidate cell, a success cause value, indication information for indicating that the first candidate cell meets the conditional handover execution condition and the access succeeds, or signal quality corresponding to some or all candidate cells other than the first candidate cell in at least one candidate cell when the terminal device successfully accesses the first candidate cell.

In a possible implementation method, when the terminal device determines, after receiving an RRC message that includes conditional handover configuration information, a first candidate cell that meets a conditional handover execution condition, and the terminal device successfully accesses the first candidate cell, the first information includes one or more of the following: cell identification information of the source cell, or signal quality corresponding to the source cell.

In a possible implementation method, when the terminal device determines, after receiving an RRC message that includes conditional handover configuration information, a first candidate cell that meets a conditional handover execution condition, and the terminal device successfully accesses the first candidate cell, the first information includes one or more of the following: signal quality corresponding to some or all candidate cells in the at least one candidate cell when a measurement report is reported, signal quality corresponding to some or all candidate cells in the at least one candidate cell when the terminal device determines the first candidate cell, signal quality corresponding to some or all candidate cells in the at least one candidate cell when the terminal device receives the RRC message including the conditional handover configuration information, or signal quality corresponding to some or all candidate cells in the at least one candidate cell when the terminal device sends the RRC reconfiguration complete message to the first candidate cell.

In a possible implementation method, when the terminal device determines, after receiving an RRC message that includes conditional handover configuration information, a first candidate cell that meets a conditional handover execution condition, and the terminal device successfully accesses the first candidate cell, the first information includes one or more of the following: a time period 1, where the time period 1 is a time period from a time point of receiving the RRC message including the conditional handover configuration information to a time point of determining the first candidate cell that meets the conditional handover execution condition, a time period 2, where the time period 2 is a time period from the time point of determining the first candidate cell that meets the conditional handover execution condition to a time point at which the terminal device successfully accesses the first candidate cell, a time period 3, where the time period 3 is a time period from the time point at which the terminal device successfully accesses the first cell to a time point at which the terminal device reports the time period 3, or a time period including any two or more consecutive time periods in the time period 1 to the time period 3.

Based on the third aspect, any implementation method of the third aspect, the seventh aspect, or any implementation method of the seventh aspect, the following implementation method is further provided:

In a possible implementation method, when the radio link failure occurs in the source cell of the terminal device, the conventional handover fails, or the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: signal quality corresponding to some or all candidate cells in the at least one candidate cell when the terminal device determines the first cell, signal quality corresponding to some or all candidate cells other than the first cell in the at least one candidate cell when the terminal device fails to access the first cell, or signal quality corresponding to some or all candidate cells other than the first cell in the at least one candidate cell when the terminal device performs a re-establishment procedure.

In a possible implementation method, when the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: signal quality corresponding to some or all candidate cells in the at least one candidate cell when the conditional handover execution condition corresponding to the first candidate cell is met, or signal quality corresponding to some or all candidate cells in the at least one candidate cell when the terminal device fails to access the first candidate cell.

In a possible implementation method, when the radio link failure occurs in the source cell of the terminal device, the first cell selected by the terminal device by performing cell selection belongs to the at least one candidate cell, and the terminal device fails to access the first cell, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines the first cell, a time period 3, where the time period 3 is a time period from the time point at which the terminal device determines the first cell to a time point at which the terminal device fails to access the first cell, a time period 4, where the time period 4 is a time period from the time point at which the terminal device fails to access the first cell to a time point at which the terminal device determines the re-establishment cell, a time period 5, where the time period 5 is a time period from the time point at which the terminal device determines the re-establishment cell to a time point at which the terminal device reports the time period 5, or a time period including any two or more consecutive time periods in the time period 1 to the time period 5.

In a possible implementation method, when the conventional handover fails, the first cell selected by the terminal device by performing cell selection belongs to the at least one candidate cell, and the terminal device fails to access the first cell, the first information further includes one or more of the following: a time period 6, where the time period 6 is a time period from a time point at which the terminal device receives the RRC reconfiguration message to a time point at which the terminal device receives a conventional handover message, a time period 7, where the time period 7 is a time period from the time point at which the terminal device receives the conventional handover message to a time point at which the conventional handover fails, a time period 8, where the time period 8 is a time period from the time point at which the conventional handover fails to a time point at which the terminal device determines the first cell, a time period 9, where the time period 9 is a time period from the time point at which the terminal device determines the first cell to a time point at which the terminal device fails to access the first cell, a time period 10, where the time period 10 is a time period from the time point at which the terminal device fails to access the first cell to a time point at which the terminal device determines the re-establishment cell, a time period 11, where the time period 11 is a time period from the time point at which the terminal device determines the re-establishment cell to a time point at which the terminal device reports the time period 11, or a time period including any two or more consecutive time periods in the time period 6 to the time period 11.

In a possible implementation method, when the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: a time period 12, where the time period 12 is a time period from a time point at which the terminal device receives the RRC reconfiguration message to a time point at which the terminal device determines the first candidate cell that meets the conditional handover execution condition, a time period 13, where the time period 13 is a time period from the time point at which the terminal device determines the first candidate cell that meets the conditional handover execution condition to a time point at which the terminal device fails to access the first candidate cell, a time period 14, where the time period 14 is a time period from the time point at which the terminal device fails to access the first candidate cell to a time point at which the terminal device determines the first cell, a time period 15, where the time period 15 is a time period from the time point at which the terminal device determines the first cell to a time point at which the terminal device fails to access the first cell, a time period 16, where the time period 16 is a time period from the time point at which the terminal device fails to access the first cell to a time point at which the terminal device determines the re-establishment cell, a time period 17 where the time period 17 is a time period from the time point at which the terminal device determines the re-establishment cell to a time point at which the terminal device reports the time period 17, or a time period including any two or more consecutive time periods in the time period 12 to the time period 17.

Based on the fourth aspect, any implementation method of the fourth aspect, the eighth aspect, or any implementation method of the eighth aspect, the following implementation method is further provided:

In a possible implementation method, when the radio link failure occurs in the source cell of the terminal device, the conventional handover fails, or the terminal device fails to access the first candidate cell that meets the conditional handover execution condition, and the cell selected by performing cell selection does not belong to the at least one candidate cell, the first information further includes one or more of the following: cell identification information of a re-establishment cell, signal quality corresponding to the re-establishment cell when a re-establishment procedure is performed, a re-establishment cause value, indication information for indicating that the cell selected by the terminal device by performing cell selection meets a cell selection criterion but does not belong to the at least one candidate cell, or signal quality corresponding to some or all candidate cells in the at least one candidate cell when the terminal device performs the re-establishment procedure.

In a possible implementation method, when the radio link failure occurs in the source cell of the terminal device, the conventional handover fails, or the terminal device fails to access the first candidate cell that meets the conditional handover execution condition, and the cell selected by performing cell selection does not belong to the at least one candidate cell, the first information further includes one or more of the following: cell identification information of the source cell, or signal quality corresponding to the source cell.

In a possible implementation method, when the radio link failure occurs in the source cell of the terminal device, the first information further includes one or more of the following: a failure cause value, indication information for indicating that the radio link failure occurs in the source cell, or signal quality corresponding to the at least one candidate cell when the radio link failure occurs in the source cell.

In a possible implementation method, when the conventional handover of the terminal device fails, the first information further includes one or more of the following: cell identification information of the target cell, signal quality corresponding to the target cell, a failure cause value, indication information for indicating that the conventional handover fails, or signal quality corresponding to at least one candidate cell when the conventional handover fails.

In a possible implementation method, when the terminal device fails to access the first candidate cell that meets the conditional handover execution condition, and the cell selected by performing cell selection does not belong to the at least one candidate cell, the first information further includes one or more of the following: cell identification information of the first candidate cell, index information corresponding to the first candidate cell, conditional handover configuration information corresponding to the first candidate cell, signal quality corresponding to the first candidate cell when the terminal device fails to access or hand over to the first candidate cell, a failure cause value, indication information for indicating that the first candidate cell meets the conditional handover execution condition but the terminal device fails to access or hand over to the first candidate cell, signal quality corresponding to other candidate cells when the terminal device fails to access or hand over to the first candidate cell, signal quality corresponding to the first candidate cell when the conditional handover execution condition corresponding to the first candidate cell is met, or signal quality corresponding to other candidate cells when the conditional handover execution condition corresponding to the first candidate cell is met.

In a possible implementation method, when the radio link failure occurs in the source cell of the terminal device, the conventional handover fails, or the terminal device fails to access the first candidate cell that meets the conditional handover execution condition, and the cell selected by performing cell selection does not belong to the at least one candidate cell, the first information further includes one or more of the following: signal quality corresponding to some or all candidate cells in the at least one candidate cell when a measurement report is reported, signal quality corresponding to some or all candidate cells in the at least one candidate cell when the terminal device receives the RRC message that includes the conditional handover configuration information, signal quality corresponding to some or all candidate cells in the at least one candidate cell when RRC re-establishment fails, signal quality corresponding to some or all candidate cells in the at least one candidate cell when an RRC establishment procedure succeeds, or signal quality corresponding to some or all candidate cells in the at least one candidate cell when the RRC re-establishment succeeds.

In a possible implementation method, when the radio link failure occurs in the source cell of the terminal device, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines a second cell, a time period 3, where the time period 3 is a time period from the time point at which the terminal device determines the second cell to a time point at which the terminal device reports the time period 3, or a time period including any two or more consecutive time periods in the time period 1 to the time period 3.

In a possible implementation method, when the conventional handover of the terminal device fails, the first information further includes one or more of the following: a time period 4, where the time period 4 is a time period from a time point at which the terminal device receives the RRC reconfiguration message to a time point at which the terminal device receives a conventional handover message, a time period 5, where the time period 5 is a time period from the time point at which the terminal device receives the conventional handover message to a time point at which the conventional handover fails, a time period 6, where the time period 6 is a time period from the time point at which the conventional handover fails to a time point at which the terminal device determines a second cell, a time period 7, where the time period 7 is a time period from the time point at which the terminal device determines the second cell to a time point at which the terminal device reports the time period 7, or a time period including any two or more consecutive time periods in the time period 4 to the time period 7

In a possible implementation method, when the terminal device fails to access the first candidate cell that meets the conditional handover execution condition, and the cell selected by performing cell selection does not belong to the at least one candidate cell, the first information further includes one or more of the following: a time period 8, where the time period 8 is a time period from a time point at which the terminal device receives the RRC reconfiguration message to a time point at which the terminal device determines the first candidate cell that meets the conditional handover execution condition, a time period 9, where the time period 9 is a time period from the time point at which the terminal device determines the first candidate cell that meets the conditional handover execution condition to a time point at which the terminal device fails to hand over to or access the first candidate cell, a time period 10, where the time period 10 is a time period from the time point at which the terminal device fails to hand over to or access the first candidate cell to a time point at which the terminal device determines a second cell, a time period 11, where the time period 11 is a time period from the time point at which the terminal device determines the second cell to a time point at which the terminal device reports the time period 11, or a time period including any two or more consecutive time periods in the time period 8 to the time period 11.

According to a ninth aspect, this application provides a communication apparatus. The apparatus may be a terminal device or a chip used in the terminal device. The apparatus has a function of implementing any one of the first aspect to the fourth aspect or embodiments of the first aspect to the fourth aspect. The function may be implemented by hardware, or may be implemented by hardware executing corresponding software. The hardware or software includes one or more modules corresponding to the functions.

According to a tenth aspect, this application provides a communication apparatus. The apparatus may be a network device, or may be a chip used in the network device. The apparatus has a function of implementing any one of the fifth aspect to the eighth aspect or embodiments of the fifth aspect to the eighth aspect. The function may be implemented by hardware, or may be implemented by hardware executing corresponding software. The hardware or software includes one or more modules corresponding to the functions.

According to an eleventh aspect, this application provides a communication apparatus, including a processor and a memory. The memory is configured to store computer-executable instructions. When the apparatus runs, the processor executes the computer-executable instructions stored in the memory, so that the apparatus performs the method in any one of the first aspect to the eighth aspect or embodiments of the first aspect to the eighth aspect.

According to a twelfth aspect, this application provides a communication apparatus, including units or means (means) configured to perform the steps in any one of the first aspect to the eighth aspect or embodiments of the first aspect to the eighth aspect.

According to a thirteenth aspect, this application provides a communication apparatus, including a processor and an interface circuit. The processor is configured to: communicate with another apparatus through the interface circuit, and perform the method according to any one of the first aspect to the eighth aspect or embodiments of the first aspect to the eighth aspect. There are one or more processors.

According to a fourteenth aspect, this application provides a communication apparatus, including a processor, connected to a memory, and configured to invoke a program stored in the memory, to perform the method according to any one of the first aspect to the eighth aspect or embodiments of the first aspect to the eighth aspect. The memory may be located inside the apparatus, or may be located outside the apparatus. In addition, there are one or more processors.

According to a fifteenth aspect, this application further provides a computer-readable storage medium. The computer-readable storage medium stores instructions. When the instructions are run on a computer, a processor is enabled to perform the method according to any one of the first aspect to the eighth aspect or embodiments of the first aspect to the eighth aspect.

According to a sixteenth aspect, this application further provides a computer program product including instructions. When the computer program product runs on a computer, the computer is enabled to perform the method according to any one of the first aspect to the eighth aspect or embodiments of the first aspect to the eighth aspect.

According to a seventeenth aspect, this application further provides a chip system, including a processor, configured to perform the method according to any one of the first aspect to the eighth aspect or embodiments of the first aspect to the eighth aspect.

According to an eighteenth aspect, this application further provides a communication system, including a first network device and a terminal device.

The first network device is configured to send first indication information to the terminal device, where the first indication information is used to request the terminal device to report first information.

The terminal device is configured to report the first information to the first network device.

When a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device successfully accesses the first cell, the first information includes one or more of the following: identification information of the first cell, index information corresponding to the first cell, signal quality corresponding to the first cell when the terminal device successfully accesses the first cell, a success cause value, or indication information for indicating that the first cell meets a cell selection criterion and the access succeeds.

The first cell belongs to the first network device, the at least one candidate cell is indicated by an RRC reconfiguration message from a second network device, the second network device is a network device to which the source cell belongs, and the first candidate cell is one of the at least one candidate cell.

According to a nineteenth aspect, this application further provides a communication system, including a first network device and a terminal device.

The first network device is configured to send first indication information to the terminal device, where the first indication information is used to request the terminal device to report first information.

The terminal device is configured to report the first information to the first network device.

When the terminal device determines, after receiving an RRC message that includes conditional handover configuration information, a first candidate cell that meets a conditional handover execution condition, and the terminal device successfully accesses the first candidate cell, the first information includes one or more of the following: identification information of the first candidate cell, index information corresponding to the first candidate cell, signal quality corresponding to the first candidate cell when the terminal device successfully accesses the first candidate cell, a success cause value, indication information for indicating that the first candidate cell meets the conditional handover execution condition and the access succeeds, or signal quality corresponding to some or all candidate cells other than the first candidate cell in at least one candidate cell when the terminal device successfully accesses the first candidate cell.

The first network device is a network device to which the first candidate cell belongs, the at least one candidate cell is indicated by an RRC reconfiguration message from a second network device, the second network device is a network device to which a source cell belongs, and the first candidate cell is one of the at least one candidate cell.

According to a twentieth aspect, this application further provides a communication system, including a first network device and a terminal device.

The first network device is configured to send first indication information to the terminal device, where the first indication information is used to request the terminal device to report first information.

The terminal device is configured to report the first information to the first network device.

When a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device fails to access the first cell, the first information includes one or more of the following: identification information of the first cell, index information corresponding to the first cell, conditional handover configuration information corresponding to the first cell, signal quality corresponding to the first cell when the terminal device fails to access the first cell, a failure cause value, or indication information for indicating that the first cell meets a cell selection criterion and the access fails.

The first cell belongs to the first network device, the at least one candidate cell is indicated by an RRC reconfiguration message from a second network device, the second network device is a network device to which the source cell belongs, and the first candidate cell is one of the at least one candidate cell.

According to a twenty-first aspect, this application further provides a communication system, including a first network device and a terminal device.

The first network device is configured to send first indication information to the terminal device, where the first indication information is used to request the terminal device to report first information.

The terminal device is configured to report the first information to the first network device.

When a radio link failure occurs in a source cell of the terminal device, conventional handover fails, or the terminal device fails to access a first candidate cell that meets a conditional handover execution condition, and a cell selected by performing cell selection does not belong to at least one candidate cell, the first information includes one or more of the following: cell identification information of a re-establishment cell, signal quality corresponding to the re-establishment cell when a re-establishment procedure is performed, a re-establishment cause value, indication information for indicating that the cell selected by the terminal device by performing cell selection meets a cell selection criterion but does not belong to the at least one candidate cell, or signal quality corresponding to some or all candidate cells in the at least one candidate cell when the terminal device performs the re-establishment procedure.

The first network device is a network device to which the re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

DETAILED DESCRIPTION OF ILLUSTRATIVE EMBODIMENTS

Figure 1:
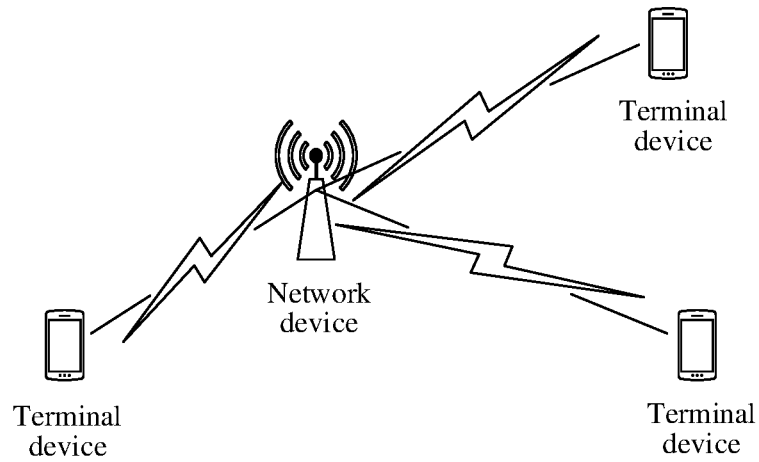
FIG. 1 is a schematic diagram of a network architecture to which this application is applicable.

To make the objectives, technical solutions, and advantages of this application clearer, the following further describes this application in detail with reference to the accompanying drawings. A specific operation method in a method embodiment may also be applied to an apparatus embodiment or a system embodiment. In descriptions of this application, unless otherwise noted, a meaning of "a plurality of" is two or more. FIG. 1 is a schematic diagram of a network architecture to which this application is applicable. The network architecture includes a terminal device and a network device. The terminal device communicates with the network device through a wireless interface.

The terminal device may be a wireless terminal device that can receive scheduling and indication information of the network device. The wireless terminal device may be a device that provides a user with voice and/or data connectivity, a handheld device with a wireless connection function, or another processing device connected to a wireless modem. The wireless terminal device may communicate with one or more core networks or the Internet through a radio access network (RAN). The wireless terminal device may be a mobile terminal device, for example a mobile phone (also referred to as a "cellular" phone), a computer, and a data card. For example, the wireless terminal device may be a portable, pocket-sized, handheld, computer built-in, or vehicle-mounted mobile apparatus that exchanges language and/or data with the radio access network. For example, the terminal device may be a device such as a personal communication service (PCS) phone, a cordless phone, a session initiation protocol (SIP) phone, a wireless local loop (WLL) station, a personal digital assistant (PDA), a tablet computer (pad), and a computer having a wireless transceiver function. The wireless terminal device may also be referred to as a system, a subscriber unit (subscriber unit), a subscriber station (subscriber station), a mobile station (MS), a remote station (remote station), an access point (AP), a remote terminal device (remote terminal), an access terminal device (access terminal), a user terminal device (user terminal), a user agent, a subscriber station (SS), customer premises equipment (CPE), a terminal, user equipment (UE), a mobile terminal (MT), or the like. Alternatively, the terminal device may be a wearable device, a terminal device in a next-generation communication system such as a 5G network, a terminal device in a future evolved public land mobile network (PLMN), a terminal device in an NR communication system, or the like. For ease of description, an example in which the terminal device is UE is used for description in embodiments of this application.

The network device is an entity configured to transmit or receive a signal on a network side, for example, a new generation NodeB (generation NodeB, gNodeB). The network device may be a device configured to communicate with a mobile device. The network device may be an AP in a wireless local area network (WLAN), an evolved NodeB (eNB or eNodeB) in long term evolution (LTE), a relay station, an access point, a vehicle-mounted device, a wearable device, a network device in a future 5G network, a network device in a future evolved public land mobile network (PLMN), a gNodeB in an NR system, or the like. In addition, in embodiments of this application, the network device provides a service for a cell, and the terminal device communicates with the network device by using a transmission resource (for example, a frequency domain resource or a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, and the like. These small cells are characterized by a small coverage area, low transmit power, and the like, and are suitable for providing high-rate data transmission services. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as the network device.

For ease of understanding of the solutions of this application, the following first describes related technologies.

1. Conventional Handover Mechanism

In a mobile communication system, in a conventional handover procedure, mobility management of UE in a connected state is controlled by a network device, that is, the network device indicates, by sending a handover message to the UE, the UE to perform handover. Specifically, a source base station sends the handover message to the UE to control the UE to hand over from a source cell to a target cell. It may be understood that the conventional handover means that a network device to which a source cell belongs sends configuration information of the target cell to the UE, so that the UE attempts to access or hand over to the target cell based on the configuration information.

The handover message may be a radio resource control (RRC) message. For example, in an NR system, the RRC message may be an RRC reconfiguration message carrying a synchronization reconfiguration information element (reconfiguration with sync). For another example, in a long term evolution (LTE) system, the RRC message may be an RRC connection reconfiguration message carrying a mobility control information element (mobility control info). The handover message includes related information of the target cell and related configuration parameters required for the UE to access the target cell. For example, the handover message may include a physical cell identifier (PCI) of the target cell, frequency information corresponding to the target cell, a cell radio network temporary identifier (C-RNTI) allocated by the target cell to the UE, random access channel (RACH)

resource information (for example, a dedicated RACH resource and/or a public RACH resource) required for accessing the target cell, and the like. After receiving the handover message, the UE accesses the target cell based on content included in the handover message. Therefore, successful sending of the handover message is a necessary condition for ensuring successful handover in a conventional handover mechanism. However, in the LTE system or the NR system, the handover message may fail to be sent due to fast attenuation of channel quality, fast movement of the UE, blocking of an object, or long duration of measurement or handover preparation. Consequently, a handover failure is caused, and a handover success rate is reduced.

2. Conditional Handover (CHO) Mechanism

In view of the above problems existing in the conventional handover, a CHO mechanism is proposed to improve a handover success rate and handover robustness. In CHO, a network can configure one or more candidate cells for the UE. Specifically, if the network configures a plurality of candidate cells for the UE, the network may send CHO configuration information corresponding to the plurality of candidate cells to the UE by using one RRC message or a plurality of RRC messages. The RRC message may be a newly defined message (for example, CondRRCReconfiguration, or a message in another naming/expression form, which is not limited herein), or an existing RRC message is reused (where for example, an RRC reconfiguration message is reused, and specifically, for example, the RRC message may be an RRC reconfiguration message, or the RRC message may be an RRC connection reconfiguration message). It may be understood that the conditional handover means that a network device to which a source cell belongs sends configuration information of at least one candidate cell to UE, and the UE determines a target cell based on the configuration information, and attempts to access or hand over to the target cell, where the target cell belongs to the at least one candidate cell.

For example, a source base station sends the RRC message to the UE when signal quality of a source link is good, where the RRC message may include CHO configuration information corresponding to each candidate cell. Specifically, the CHO configuration information may include CHO trigger condition (or execution condition) information and related information of the candidate cell.

The related information of the candidate cell may include one or more of the following:
(1) a C-RNTI allocated by the candidate cell to the UE,
(2) RACH resource information required for accessing the candidate cell,
(3) index information corresponding to the candidate cell, where the index information is used to identify the candidate cell, and specifically, the index information may be a measurement message measID corresponding to the cell and/or a CHO configuration identity CHO-ConfigId corresponding to the cell, or may be represented in another form, which is not limited in embodiments of this application,
(4) a cell global identifier (CGI) of the candidate cell, or an evolved cell global identifier (ECGI) of the candidate cell,
(5) a PCI of the candidate cell,
(6) frequency information corresponding to the candidate cell, which may specifically include one or more of the following: an absolute frequency (for example, absoluteFrequencySSB) of a synchronization signal block (SSB), an absolute frequency position (for example, absoluteFrequencyPointA) of a reference resource block (for example, a common resource block o common RBo), a frequency bandwidth list (for example, frequencyBandList), or a subcarrier spacing (SCS)-specific carrier list (for example, scs-SpecificCarrierList), (7) a physical layer configuration parameter corresponding to the candidate cell, (8) a medium access control (MAC) layer configuration parameter corresponding to the candidate cell, (9) a radio link control (RLC) layer configuration parameter corresponding to the candidate cell,

(10) a packet data convergence protocol (PDCP) layer configuration parameter corresponding to the candidate cell,

(11) a service data adaptation protocol (SDAP) layer configuration parameter corresponding to the candidate cell, or

(12) an RRC layer configuration parameter corresponding to the candidate cell.

The CHO trigger condition (or execution condition) information may include a CHO execution event type and a corresponding threshold. The CHO execution event type may include an A1 event, an A2 event, an A3 event, an A4 event, an A5 event, a B1 event, a B2 event, or another execution event type. Specifically, the A1 event is that signal quality of a serving cell is higher than a threshold, the A2 event is that signal quality of a serving cell is lower than a threshold, the A3 event is that signal quality of a neighboring cell is a threshold higher than signal quality of a special cell SpCell (where the special cell may include a primary cell PCell or a primary secondary cell PSCell), the A4 event is that signal quality of a neighboring cell is higher than a threshold, the A5 event is that signal quality of a special cell is lower than a threshold 1, and signal quality of a neighboring cell is higher than a threshold 2, the B1 event is that signal quality of an inter-RAT (Radio Access Technology) neighboring cell is higher than a threshold, the event B2 is that signal quality of a PCell is lower than a threshold 3, and signal quality of an inter-RAT neighboring cell is higher than a threshold 4.

For example, one or more CHO execution conditions may be configured for one candidate cell. For example, one execution event type may be configured for one candidate cell, but at least one threshold and/or a maximum of two different trigger quantities are/is configured for the candidate cell. The trigger quantity may include, for example, reference signal received power (RSRP), reference signal received quality (RSRQ), and a signal to interference plus noise ratio (SINR). For another example, at least one execution event type and a threshold corresponding to each execution event type may be configured for one candidate cell. CHO execution event types and/or threshold values corresponding to the CHO execution event types corresponding to different candidate cells may be the same or different. This is not limited.

After receiving the RRC message, the UE determines, based on the RRC message, whether the candidate cells meet a CHO execution condition, and uses a candidate cell that meets the CHO execution condition as the target cell. Specifically, the UE determines, based on the CHO configuration information, whether the CHO execution condition is met. For example, for a candidate cell A, a configured CHO execution event type is an A3 event, and a configured corresponding threshold is a first threshold (where it should be noted that first thresholds corresponding to different trigger quantities may be the same or different). In this case, when the cell signal quality (where the signal quality includes one or more of RSRP, RSRQ, and an SINR, and for example, the signal quality includes the RSRP and the RSRQ, or the signal quality includes the RSRP and the SINR, which is not limited herein) of the candidate cell A is the first threshold higher than cell signal quality of a serving cell, it may be considered that the candidate cell A meets the CHO execution condition, and the candidate cell A may be determined as the target cell. For another example, for a candidate cell B, an A3 event is configured, two trigger quantities, for example, RSRP and RSRQ, are configured, a configured first threshold corresponding to the RSRP is E, and a configured first threshold corresponding to the RSRQ is F. In this case, when the RSRP of the candidate cell A is E higher than RSRP of a serving cell, and the RSRQ of the candidate cell A is F higher than RSRQ of the serving cell, it may be considered that the candidate cell A meets the CHO execution condition, and the candidate cell A may be determined as the target cell. For another example, for a candidate cell B, a configured CHO execution event type is an event A5, and configured corresponding thresholds are a second threshold and a third threshold. In this case, when cell signal quality of the candidate cell B is greater than the second threshold, and cell signal quality of a serving cell is less than the third threshold, it may be considered that the candidate cell B meets the CHO execution condition, and the candidate cell B may be determined as the target cell.

For the CHO mechanism, the following several cases may exist, which are separately described below.

Case 1: After determining the target cell (where the target cell may be referred to as a first candidate cell) that meets the CHO execution condition in the at least one candidate cell (where in an existing CHO mechanism, after determining, for the first time based on the CHO configuration information, a target cell that meets the CHO execution condition, the UE no longer determines whether another candidate cell meets the CHO execution condition), the UE starts a timer T1 (where T1 may be predefined in a protocol, or an RRC message including the CHO configuration information includes related information of the timer T1, for example, a validity period of T1), and the UE attempts to access or hand over to the determined target cell, for example, the UE performs a random access procedure with the determined target cell.

The case 1 further includes a case 1.1 or a case 1.2.

Case 1.1: If random access is successfully completed within the validity period of T1, the UE sends an RRC message (for example, an RRC reconfiguration complete message) to a network device to which the target cell belongs, to notify the network device that the conditional handover is completed.

Case 1.2: If T1 expires and the UE fails to access the target cell, the UE performs cell selection (for example, selects a cell that meets an S criterion). The cell selection is further divided into the following case 1.2.1 or case 1.2.2:

Case 1.2.1: If the selected cell is one of the at least one candidate cell, the UE attempts to hand over to the cell (where the cell may be referred to as a first cell). For example, the UE performs a random access procedure with the first cell.

Case 1.2.1 may be further divided into the following case 1.2.1.1 or case 1.2.1.2.

Case 1.2.1.1: If the UE successfully accesses or hands over to the first cell, it is considered that the CHO procedure succeeds.

Case 1.2.1.2: If the UE fails to access or hand over to the first cell, the UE performs a re-establishment procedure.

Case 1.2.2: If the selected cell does not belong to the at least one candidate cell, the UE performs a re-establishment procedure.

Optionally, after determining the target cell (namely, the first candidate cell) that meets the CHO execution condition, the UE may skip the random access procedure, that is, may not perform the random access procedure. In other words, after determining the target cell, the UE may not perform the random access procedure, but sends an RRC reconfiguration complete message to a target network device (for example, if the RRC message including the CHO configuration information includes related information of RACH-less HO, such as TA information and UL grant information, where the related information of the RACH-less HO corresponds to the at least one candidate cell, the UE may not perform the random access procedure with the determined target cell).

Case 2: Before the UE determines, based on the CHO configuration information, the target cell (where the target cell may be referred to as a first candidate cell) that meets the CHO execution condition in the at least one candidate cell, or before the UE determines the target cell (namely, the first candidate cell) but is not successfully handed over to the target cell, if a radio link failure (Radio Link Failure, RLF) occurs in the source cell, the UE performs cell selection (for example, selects a cell that meets an S criterion, where the S criterion may be an S criterion in existing cell selection, or may be an S criterion in subsequent cell selection, which is not limited herein).

The cell selection is further divided into the following case 2.1 or case 2.2:

Case 2.1: If the selected cell is one of the at least one candidate cell, the UE attempts to hand over to the cell (where the cell may be referred to as a first cell, for example, the UE performs a random access procedure with the cell). The case 2.1 may further include the following case 2.1.1 or case 2.1.2:

Case 2.1.1: If the UE successfully accesses or hands over to the first cell, it is considered that the CHO procedure succeeds.

For example, if the UE successfully performs random access to the first cell, the UE successfully accesses or hands over to the first cell. Further, in an NR system, the UE may send an RRC reconfiguration complete message to the first cell. In an LTE system, the UE may send an RRC connection reconfiguration complete message to the first cell.

Case 2.1.2: If the UE fails to access or hand over to the cell (namely, the first cell), the UE performs a re-establishment procedure.

Case 2.2: If the selected cell does not belong to the at least one candidate cell, the UE performs a re-establishment procedure.

Case 3: In the CHO mechanism, a source network device may maintain an RRC connection/data transmission with the UE until the UE successfully hands over to the determined target cell (where the target cell may be referred to as a first candidate cell) that meets the CHO execution condition (for example, until the UE sends an RRC reconfiguration complete message or an RRC connection reconfiguration complete message to the successfully accessed target cell). That is, after a network sends the RRC message including the CHO configuration information to the UE for the first time, the network may further send another RRC message to the UE subsequently, for example, may send a conventional handover message to the UE.

Correspondingly, before the UE determines, based on the CHO configuration information, the target cell (namely, the first candidate cell) that meets the CHO execution condition, if the UE receives the conventional handover message, the UE stops the CHO procedure (for example, the UE stops a procedure of attempting to determine the target cell that meets the CHO execution condition in the at least one candidate cell), and performs a conventional handover procedure based on the conventional handover message. Alternatively, after the UE determines the first candidate cell and before the UE successfully hands over to the first candidate cell, if the UE receives the conventional handover message, the UE stops the CHO procedure (for example, the UE stops a random access procedure with the determined first candidate cell), and the UE performs a conventional handover procedure based on the conventional handover message.

The case 3 further includes a case 3.1 or a case 3.2.

Case 3.1: If the conventional handover procedure fails (for example, the UE fails to access the target cell indicated by the conventional handover message during the validity period of T304, where related information of T304, for example, the validity period of T304, is included in the conventional handover message), the UE performs cell selection (for example, selects a cell that meets an S criterion). The cell selection is further divided into the following two cases (a case 3.1.1 or a case 3.1.2):

Case 3.1.1: If the selected cell is one of the at least one candidate cell, the UE attempts to hand over to the cell (where the cell may be referred to as a first cell, and for example, the UE performs a random access procedure with the cell). The case may further include the following two cases:

Case 3.1.1.1: If the UE successfully accesses or hands over to the cell (namely, the first cell), it is considered that the CHO procedure succeeds.

For example, if the UE successfully performs random access to the first cell, the UE successfully accesses or hands over to the first cell. Further, in an NR system, the UE may send an RRC reconfiguration complete message to the first cell. In an LTE system, the UE may send an RRC connection reconfiguration complete message to the first cell.

Case 3.1.1.2: If the UE fails to access or hand over to the first cell, the UE performs a re-establishment procedure.

Case 3.1.2: If the selected cell does not belong to the at least one candidate cell, the UE performs a re-establishment procedure.

Case 3.2: If the conventional handover procedure succeeds, the UE successfully accesses or hands over to the target cell included in the handover message.

3. MRO Mechanism

Regardless of whether the conventional handover mechanism or the conditional handover mechanism is used, a handover parameter (for example, the configuration information of the target cell or the configuration information of the at least one candidate cell) is one of key factors that affect success rates of the conventional handover and the conditional handover. In the conventional handover mechanism, to optimize a handover parameter, an MRO mechanism is introduced. To be specific, the UE reports related information in a conventional handover process. Further, a network device may optimize a handover parameter based on the related information reported by the UE. In the MRO mechanism, in the conventional handover procedure, the UE usually reports related parameters in the handover process in the following two scenarios:

(1) The UE fails to receive a handover message, and an RLF occurs.

(2) A handover message is successfully received, but the UE fails to hand over to a target cell or an RLF occurs shortly after the UE is handed over to the target cell.

The handover message includes configuration information of the target cell, and specific content is not described again.

Specifically, existing MRO-based recording scenarios (mainly for the conventional handover procedure) include:

(1) The UE fails to receive the handover message, the RLF occurs, and then the UE successfully performs re-establishment in a new cell. In this case, information recorded by the UE and reported to the new cell includes some or all of the following: a failure cause value (that is, the RLF), information about a source cell (for example, including cell identification information of the source cell and signal quality corresponding to the source cell), information about a re-establishment cell (namely, the new cell) (for example, including cell identification information of the re-establishment cell and signal quality corresponding to the re-establishment cell), time from occurrence to reporting of the RLF, and the like. The re-establishment cell may be the target cell or another cell. This is not limited herein.

(2) The UE successfully receives the handover message, but the handover to the target cell fails, or an RLF occurs shortly after the handover to the target cell succeeds (for example, signal quality of the target cell is unstable, and after the UE is handed over to the target cell, signal quality of the cell becomes very poor), and the UE initiates a re-establishment procedure, where a cell (which may be referred to as a re-establishment cell) in which the UE initiates re-establishment may be a source cell, the target cell, or another cell. This is not limited herein. In this case, information recorded by the UE and reported to the new cell includes some or all of the following: a failure cause value (that is, a handover failure HOF), information about a source cell (for example, including cell identification information of the source cell and signal quality corresponding to the source cell), information about the target cell (for example, including cell identification information of the target cell and signal quality corresponding to the target cell), information about the re-establishment cell (for example, including cell identification information of the re-establishment cell and signal quality corresponding to the re-establishment cell), a period from a time point of receiving the handover message to a time point when the handover failure occurs, and a period from the time point of the handover failure to a time point of reporting.

Specifically, the information about the cells (for example, the source cell, the target cell, and the re-establishment cell) may include: identifiers of the cells, and/or signal quality corresponding to the cells (where the signal quality mentioned in this application may include cell signal quality and/or signal quality of at least one beam belonging to the cells, the signal quality includes RSRP and/or RSRQ and/or an SINR, and the signal quality may be a measurement result obtained through radio resource management (Radio Resource Management, RRM) measurement based on a synchronization signal block (Synchronization Signal Block, SSB) and/or a channel state information reference signal (Channel state information Reference Signal, CSI-RS)). The identifier of the cell may include at least one of the following: a PCI, a CGI, an ECGI, or frequency information corresponding to the cell.

In an example, the UE sends indication information to a first network device. The indication information is used to indicate that the UE records RLF- or HOF-related information. For specific included content, refer to the foregoing descriptions. Details are not described again. An NR system is used as an example. For example, the indication information may be included in an RRC establishment complete message, an RRC re-establishment complete message, an RRC resume complete message, or an RRC reconfiguration complete message sent by the UE to the first network device. This is not limited. The first network device sends a request message to the UE (where for example, the request message may be a user information request (UEInformationRequest) message). After receiving the request message sent by the first network device, the UE reports corresponding information recorded by the UE to the first network device (where for example, the UE sends a user information response (UEInformationResponse) message to the first network device, and the UEInformationResponse message may include the corresponding information recorded by the UE, such as the RLF- or HOF-related information). The first network device may be a network device to which the source cell belongs, a network device to which the target cell belongs, a network device to which the re-establishment cell belongs, or another network device. This is not limited herein. After receiving the information reported by the UE, the first network device may send the information reported by the UE to another network device. For example, the first network device is a network device to which the source cell belongs, and the network device to which the source cell belongs may send, to a network device to which the target cell belongs and/or a network device to which the re-establishment cell belongs, a part or all of the information reported by the UE. The network device to which the target cell belongs, the network device to which the re-establishment cell belongs, or the network device to which the source cell belongs adjusts a corresponding parameter based on a part or all of the received information. For another example, the first network device is a network device to which the target cell belongs, and the network device to which the target cell belongs may send, to a network device to which the source cell belongs and/or a network device to which the re-establishment cell belongs, a part or all of the information reported by the UE. Optionally, the network device to which the source cell belongs sends a part or all of the received information to the network device to which the re-establishment cell belongs. The network device to which the source cell belongs, the network device to which the target cell belongs, or the network device to which the re-establishment cell belongs adjusts a corresponding parameter based on a part or all of the received information. For another example, the first network device is a network device to which the re-establishment cell belongs, and the network device to which the re-establishment cell belongs may send, to a network device to which the source cell belongs and/or a network device to which the target cell belongs, a part or all of the information reported by the UE. Optionally, the network device to which the source cell belongs sends a part or all of the received information to the network device to which the target cell belongs. The network device to which the source cell belongs, the network device to which the target cell belongs, or the network device to which the re-establishment cell belongs adjusts a corresponding parameter based on a part or all the received information.

In the foregoing mobility robustness optimization mechanism, only recording and reporting of related information generated in the conventional handover mechanism are considered. However, currently, there is no corresponding method for recording and reporting related information generated in the conditional handover procedure. The UE also needs to consider recording and reporting of related information generated in various scenarios mentioned in the foregoing case 1 to case 3, so that the network can adjust and optimize related parameters in the conditional handover mechanism and the conventional handover mechanism based on the related information, thereby improving system reliability.

It should be noted that, in embodiments of this application, identification information mentioned anywhere below may be at least one of a CGI, an ECGI, a PCI, and frequency information. The frequency information includes but is not limited to one or more of the following items: an SSB absolute frequency (absoluteFrequencySSB), absoluteFrequencyPointA (absoluteFrequencyPointA), a frequency bandwidth list (frequencyBandList), or a subcarrier spacing (subcarrier spacing, SCS)-specific carrier list (scs-SpecificCarrierList).

In embodiments of this application, index information mentioned anywhere below may be a measurement identity (measID) corresponding to the cell or CHO-ConfigId corresponding to the cell, or may be in another representation form. This is not limited in embodiments of this application, provided that the index information may be used to identify the cell.

First, the following describes a method for recording related information in a CHO procedure provided in this application. Descriptions are provided below based on scenarios.

It should be noted that, in the following scenarios, when the UE records information, all pieces of information may be recorded in a same variable or information element or different variables or information elements. This is not limited in this application. A premise of the following scenarios is that the UE receives CHO configuration information (which may be carried in an RRC reconfiguration message or an RRC connection reconfiguration message) of at least one candidate cell from a network device (which is subsequently referred to as a second network device in this application) to which a source cell belongs. For specific content of the CHO configuration information of the at least one candidate cell, refer to the foregoing descriptions. Details are not described herein again.

Scenario 1: The UE performs cell selection when an RLF occurs in the source cell of the UE, conventional handover fails, or the UE fails to access or hand over to a candidate cell (referred to as a first candidate cell) that meets a CHO execution condition, a cell selected by the UE by performing cell selection belongs to the at least one candidate cell (where for example, the cell is referred to as a first cell), and the UE successfully accesses or hands over to the first cell.

When the RLF occurs in the source cell of the UE, if the cell selected by the UE by performing cell selection belongs to the at least one candidate cell (namely, the cell is the first cell), and the UE successfully accesses or hands over to the cell, the foregoing case 2.1.1 is corresponded to.

When the conventional handover fails, if the cell selected by the UE by performing cell selection belongs to the at least one candidate cell (that is, the cell is the first cell), and the UE successfully accesses or hands over to the cell, the foregoing case 3.1.1.1 is corresponded to.

When the UE fails to access or hand over to the candidate cell (referred to as the first candidate cell) that meets the CHO execution condition, if the cell selected by the UE by performing cell selection belongs to the at least one candidate cell (that is, the cell is the first cell), and the UE successfully accesses or hands over to the first cell, the foregoing case 1.2.1.1 is corresponded to.

In the scenario 1, an NR system is used as an example for specific description, and the UE may record one or more of the following in a corresponding variable or information element:

(1) Related information corresponding when the UE successfully accesses or hands over to the first cell, which for example, may include one or more of the following: identification information of the first cell, index information corresponding to the first cell, signal quality corresponding to the first cell when the UE successfully accesses or hands over to the first cell, a success cause value (where for example, the cause value is "the first cell meets a cell selection criterion (or meets an S criterion), and the access or handover succeeds"), or indication information for indicating that the first cell meets the cell selection criterion (or meets the S criterion) and the access or handover succeeds.

(2) Related information corresponding to the source cell, which for example, may include one or more of the following: cell identification information of the source cell, or signal quality corresponding to the source cell. Optionally, when the RLF occurs in the source cell, the UE may further record one or more of the following information: a failure cause value (where for example, the cause value is "the RLF occurs in the source cell"), indication information for indicating that the RLF occurs in the source cell, or signal quality corresponding to the at least one candidate cell when the RLF occurs in the source cell.

(3) Optionally, when the conventional handover fails, the UE may further record related information corresponding when the conventional handover fails, which for example, may include one or more of the following: cell identification information of the target cell (where the handover message includes the configuration information of the target cell), signal quality corresponding to the target cell, a failure cause value (where for example, the cause value is "HOF" or "T304 expires"), indication information for indicating that the conventional handover fails (or T304 expires), or signal quality corresponding to the at least one candidate cell when the conventional handover fails (or T304 expires).

(4) Optionally, when the UE fails to access or hand over to the first candidate cell, the UE may further record related information corresponding when the UE fails to access or hand over to the first candidate cell, which for example, may include one or more of the following: cell identification information of the first candidate cell, index information corresponding to the first candidate cell, CHO configuration information corresponding to the first candidate cell, signal quality corresponding to the first candidate cell when the UE fails to access or hand over to the first candidate cell, a failure cause value (where for example, the cause value is "the CHO execution condition is met, but the UE fails to access or hand over to the first candidate cell"), indication information for indicating that the first candidate cell meets the CHO execution condition but the UE fails to access or hand over to the first candidate cell, signal quality corresponding to other candidate cells (that is, some or all candidate cells other than the first candidate cell in the at least one candidate cell) when the UE fails to access or hand over to the first candidate cell, signal quality corresponding to the first candidate cell when the CHO execution condition corresponding to the first candidate cell is met, or signal quality corresponding to other candidate cells (that is, some or all of candidate cells other than the first candidate cell in the at least one candidate cell) when the CHO execution condition corresponding to the first candidate cell is met.

(5) Signal quality corresponding to some or all candidate cells in the at least one candidate cell when a measurement report is reported, signal quality corresponding to some or all candidate cells in the at least one candidate cell when the UE determines the first cell, signal quality corresponding to some or all candidate cells other than the first candidate cell in the at least one candidate cell when the UE successfully accesses the first cell (for example, when the UE successfully accesses a RACH of the first cell, specifically, when the UE receives an MSG 4 (for example, a contention conflict resolution message) in a contention-based random access procedure, or when the UE receives an MSG 2 (for example, a random access response message) in a non-contention-based random access procedure), signal quality corresponding to some or all candidate cells in the at least one candidate cell when the UE receives an RRC message (for example, an RRC reconfiguration message or an RRC connection reconfiguration message) including conditional handover configuration information, or signal quality corresponding to some or all candidate cells in the at least one candidate cell when the UE sends an RRC reconfiguration complete message to the first cell (where in an LTE system, the UE sends an RRC connection reconfiguration complete message to the first cell).

(6) Time Information

For example, when an RLF occurs in the source cell, the UE may record one or more of the following information: a time period 1, where the time period 1 is a time period from a time point at which the UE receives the RRC reconfiguration message to a time point at which the radio link failure occurs in the source cell, a time period 2, where the time period 2 is a time period from the time point at which the radio link failure occurs in the source cell to a time point at which the UE determines the first cell, a time period 3, where the time period 3 is a time period from the time point at which the UE determines the first cell to a time point at which the UE successfully accesses or hands over to the first cell, a time period 4, where the time period 4 is a time period from the time point at which the UE successfully accesses or hands over to the first cell to a time point at which the UE reports the time period 4, where the successful access or handover may be successful random access or successful sending of the RRC reconfiguration complete message, in other words, the time period 3 may be a time period from the time point at which the UE determines the first cell to a time point at which the UE successfully performs random access to the first cell, or the time period 3 may be a time period from the time point at which the UE determines the first cell to a time point at which the UE sends the RRC reconfiguration complete message, and the time period 4 may be a time period from the time point at which the UE successfully performs random access to the first cell to the time point at which the UE reports the time period 4, or the time period 4 may be a time period from the time point at which the UE sends the RRC reconfiguration complete message to the time point at which the UE reports the time period 4, or a time period including any two or more consecutive time periods in the time period 1 to the time period 4. For example, the time period 1 and the time period 2 may form a new time period, and the time period 3 and the time period 4 may form a new time period. For another example, the time period 2 and the time period 3 may form a new time period. For another example, the time period 1 to the time period 3 may form a new time period. Examples are not described one by one.

It should be noted that the time point at which the radio link failure occurs in the source cell may be the same as or different from the time point at which the UE determines the first cell. When the two time points are the same, the time period 2 is "o" or the UE does not need to record the time period 2. In this case, the time period 1 may be replaced with "the time period 1 is a time period from a time point at which the UE receives the RRC reconfiguration message to a time point at which the UE determines the first cell", and the time period 3 may be replaced with "the time period 3 is a time period from a time point at which the radio link failure occurs in the source cell to a time point at which the UE successfully accesses or hands over to the first cell".

It should be noted that, during specific implementation, the time period 1 to the time period 4 or a time period obtained based on the time period 1 to the time period 4 may be one or more of the following time periods recorded when the RLF occurs in the source cell: the time period 1, the time period 2, the time period 3, and a time period obtained based on any two or more consecutive time periods in the time period 1 to the time period 3, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 4 (for example, when the UE successfully accesses/hands over to the first cell in the scenario 1, for example, when the UE sends the RRC reconfiguration complete message to the first cell), the UE records the time period 4, a time period including the time period 3 and the time period 4, and/or a time period obtained by combining the time period 4 with a new time period including a time period X to the time period 3, where X is either 1 or 2. For example, the time period may be recorded in another variable or information element, where the variable or information element may be newly defined or an existing variable or information element such as timeSinceFailure may be reused. This is not limited.

For another example, when the conventional failure occurs, the UE may record one or more of the following information: a time period 5, where the time period 5 is a time period from a time point at which the UE receives the RRC reconfiguration message to a time point at which the UE receives a conventional handover message, a time period 6, where the time period 6 is a time period from the time point at which the UE receives the conventional handover message to a time point at which the conventional handover fails, a time period 7, where the time period 7 is a time period from the time point at which the conventional handover fails to a time point at which the UE determines the first cell, a time period 8, where the time period 8 is a time period from the time point at which the UE determines the first cell to a time point at which the UE successfully accesses the first cell, a time period 9, where the time period 9 is a time period from the time point at which the UE successfully accesses or hands over to the first cell to a time point at which the UE reports the time period 9, where the successful access or handover may be successful random access or successful sending of the RRC reconfiguration complete message, and in other words, the time period 8 may be a time period from the time point at which the UE determines the first cell to a time point at which the UE successfully performs random access to the first cell, or the time period 8 may be a time period from the time point at which the UE determines the first cell to a time point at which the UE sends the RRC reconfiguration complete message, and the time period 9 may be a time period from the time point at which the UE successfully performs random access to the first cell to the time point at which the UE reports the time period 9, or the time period 9 may be a time period from the time point at which the UE sends the RRC reconfiguration complete message to the time point at which the UE reports the time period 9, or a time period including any two or more consecutive time periods in the time period 5 to the time period 9.

It should be noted that the time point at which the conventional handover fails may be the same as or different from the time point at which the UE determines the first cell. When the two time points are the same, the time period 7 is "o" or the UE does not need to record the time period 7. In this case, the time period 6 may be replaced with "the time period 6 is a time period from the time point at which the UE receives the conventional handover message to a time point at which the UE determines the first cell", and the time period 8 may be replaced with "the time period 8 is a time period from the time point at which the conventional handover fails to a time point at which the UE successfully accesses the first cell".

It should be noted that, during specific implementation, the time period 5 to the time period 9 or a time period obtained based on the time period 5 to the time period 9 may be one or more of the following time periods recorded when the conventional handover fails: the time period 5, the time period 6, the time period 7, the time period 8, and a time period obtained based on any two or more consecutive time periods in the time period 5 to the time period 8, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 9 (for example, when the UE successfully accesses/hands over to the first cell in the scenario 1, for example, when the UE sends the RRC reconfiguration complete message to the first cell), the UE records the time period 9, a time period including the time period 8 and the time period 9, and/or a time period obtained by combining the time period 9 with a new time period including a time period X to the time period 8, where X is any value from 5 to 7. For example, the time period may be recorded in another variable or information element, where the variable or information element may be newly defined or an existing variable or information element such as timeSinceFailure may be reused. This is not limited.

For another example, when the UE fails to access or hand over to the candidate cell (namely, the first candidate cell) that meets the CHO execution condition, the UE may record one or more of the following information: a time period 10, where the time period 10 is a time period from a time point at which the UE receives the RRC reconfiguration message to a time point at which the UE determines the first candidate cell that meets the conditional handover execution condition, a time period 11, where the time period 11 is a time period from the time point at which the UE determines the first candidate cell that meets the conditional handover execution condition to a time point at which the UE fails to access the first candidate cell, a time period 12, where the time period 12 is a time period from the time point at which the UE fails to access the first candidate cell to a time point at which the UE determines the first cell, a time period 13, where the time period 13 is a time period from the time point at which the UE determines the first cell to a time point at which the UE successfully accesses or hands over to the first cell, where the successful access or handover may be successful random access or successful sending of the RRC reconfiguration complete message, and in other words, the time period 13 may be a time period from the time point at which the UE determines the first cell to a time point at which the UE successfully performs random access to the first cell, or the time period 13 may be a time period from the time point at which the UE determines the first cell to a time point at which the UE sends the RRC reconfiguration complete message. a time period 14, where the time period 14 is a time period from the time point at which the UE successfully accesses or hands over to the first cell to a time point at which the UE reports the time period 14, where the successful access or handover may be successful random access or successful sending of the RRC reconfiguration complete message, and the time period 14 may be a time period from the time point at which the UE successfully performs random access to the first cell to the time point at which the UE reports the time period 14, or the time period 14 may be a time period from the time point at which the UE sends the RRC reconfiguration complete message to a time point at which the UE reports the time period 14, or a time period including any two or more consecutive time periods in the time period 10 to the time period 14.

It should be noted that the time point at which the UE fails to access the first candidate cell may be the same as or different from the time point at which the UE determines the first cell. When the two time points are the same, the time period 12 is "0" or the UE does not need to record the time period 12. In this case, the time period 11 may be replaced with "the time period 11 is a time period from the time point at which the UE determines the first candidate cell that meets the conditional handover execution condition to the time point at which the UE determines the first cell", and the time period 13 may be replaced with "the time period 13 is a time period from the time point at which the UE fails to access the first candidate cell to the time point at which the UE successfully accesses or hands over to the first cell".

It should be noted that, during specific implementation, the time period 10 to the time period 14 or a time period obtained based on the time period 10 to the time period 14 may be one or more of the following time periods recorded when the UE fails to access or hand over to the candidate cell (namely, the first candidate cell) that meets the CHO execution condition: the time period 10, the time period 11, the time period 12, the time period 13, and a time period obtained based on any two or more consecutive time periods in the time period 10 to the time period 13, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 14 (for example, when the UE successfully accesses/hands over to the first cell in the scenario 1, for example, when the UE sends the RRC reconfiguration complete message to the first cell), the UE records the time period 14, a time period including the time period 13 and the time period 14, and/or a time period obtained by combining the time period 14 with a new time period including a time period X to the time period 13, where X is any value from 10 to 12. For example, the time period may be recorded in another variable or information element, where the variable or information element may be newly defined or an existing variable or information element such as timeSinceFailure may be reused. This is not limited.

In the scenario 1, the RRC reconfiguration complete message sent by the UE to the first cell (or the network device to which the first cell belongs) includes indication information, where the indication information is used to indicate that the UE records one or more of the foregoing information (1) to (6).

Scenario 2: After receiving the RRC message including the CHO configuration information, the UE determines a candidate cell (referred to as a first candidate cell) that meets a CHO execution condition, and the UE successfully accesses or hands over to the first candidate cell.

This scenario corresponds to the case 1.1.

In the scenario 2, an NR system is used as an example for specific description, and the UE may record one or more of the following in a corresponding variable or information element:

(1) Related information corresponding when the UE successfully accesses or hands over to the first candidate cell, which, for example, may include one or more of the following: identification information of the first candidate cell, index information corresponding to the first candidate cell, signal quality corresponding to the first candidate cell when the UE successfully accesses or hands over to the first candidate cell, and a success cause value (where for example, the cause value is "the cell meets the CHO execution condition, and the access or handover succeeds"), indication information for indicating that the first candidate cell meets the CHO execution condition and the access or handover succeeds, or signal quality corresponding to some or all candidate cells other than the first candidate cell in the at least one candidate cell when the UE successfully accesses or hands over to the first candidate cell (for example, when the UE successfully accesses or hands over to a RACH of the first candidate cell, specifically, for example, when the UE receives an MSG 4 (for example, a contention conflict resolution message) in a contention-based random access procedure, or when the UE receives an MSG 2 (for example, a random access response message) in a non-contention-based random access procedure). "When the UE successfully accesses or hands over to the first candidate cell" may be replaced with "when the UE successfully performs random access to the first candidate cell".

(2) Related information corresponding to the source cell, which for example, may include one or more of the following: cell identification information of the source cell, or signal quality corresponding to the source cell.

(3) Signal quality corresponding to some or all candidate cells in the at least one candidate cell when a measurement report is reported, signal quality corresponding to some or all candidate cells in the at least one candidate cell when the UE determines the first candidate cell, signal quality corresponding to some or all candidate cells in the at least one candidate cell when the UE receives the RRC message (for example, the RRC reconfiguration message or the RRC connection reconfiguration message) including the conditional handover configuration information, or signal quality corresponding to some or all candidate cells in the at least one candidate cell when the UE sends the RRC reconfiguration complete message to the first candidate cell (where in an LTE system, the UE sends an RRC connection reconfiguration complete message to the first candidate cell).

(4) Time information, which for example, includes one or more of the following: a time period 1, where the time period 1 is a time period from a time point of receiving the RRC message including the CHO configuration information to a time point of determining the first candidate cell that meets the CHO execution condition, a time period 2, where the time period 2 is a time period from the time point of determining the first candidate cell that meets the CHO execution condition to a time point at which the UE successfully accesses or hands over to the first candidate cell, a time period 3, where the time period 3 is a time period from the time point at which the UE successfully accesses or hands over to the first candidate cell to a time point at which the UE reports the time period 3, where the successful access or handover may be successful random access or successful sending of the RRC reconfiguration complete message, and in other words, the time period 2 may be a time period from the time point at which the UE determines the first candidate cell to a time point at which the UE successfully performs random access to the first candidate cell, or the time period 2 may be a time period from the time point at which the UE determines the first candidate cell to a time point at which the UE sends the RRC reconfiguration complete message, and the time period 3 may be a time period from the time point at which the UE successfully performs random access to the first candidate cell to the time point at which the UE reports the time period 3, or the time period 3 may be a time period from the time point at which the UE sends the RRC reconfiguration complete message to the time point at which the UE reports the time period 3, or a time period including any two or more consecutive time periods in the time period 1 to the time period 3.

It should be noted that, during specific implementation, the time period 1 to the time period 3 or a time period obtained based on the time period 1 to the time period 3 may be one or more of the following time periods recorded when the RLF occurs in the source cell: the time period 1, the time period 2, and a time period obtained based on the time period 1 and the time period 2, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 3 (for example, when the UE successfully accesses/hands over to the first candidate cell in the scenario 2, for example, when the UE sends the RRC reconfiguration complete message to the first candidate cell), the UE records the time period 3, a time period including the time period 2 and the time period 3, and/or a time period including the time period 1 to the time period 3. For example, the time period may be recorded in another variable or information element, where the variable or information element may be newly defined or an existing variable or information element such as timeSinceFailure may be reused. This is not limited.

In the scenario 2, the RRC reconfiguration complete message sent by the UE to the first candidate cell (or the network device to which the first candidate cell belongs) includes indication information, where the indication information is used to indicate that the UE records one or more of the foregoing information (1) to (4).

Scenario 3: When the RLF occurs in the source cell of the UE, the conventional handover fails, or the UE fails to access or hand over to the candidate cell (referred to as the first candidate cell) that meets the CHO execution condition, and a cell selected by the UE by performing cell selection is a candidate cell but the UE fails to access or hand over to the cell (referred to as the first cell). When the UE fails to access or hand over to the first cell, the UE initiates an RRC re-establishment procedure. The re-establishment procedure may succeed or fail. When the re-establishment procedure fails, the UE enters an idle state, and the UE performs an RRC establishment procedure.

When the RLF occurs in the source cell of the UE, if the cell selected by the UE by performing cell selection is a candidate cell (where the cell is the first cell), but the UE fails to access or hand over to the first cell, the foregoing case 2.1.2 is corresponded to. When the conventional handover fails, if the cell selected by the UE by performing cell selection is a candidate cell (where the cell is the first cell), but the UE fails to access or hand over to the first cell, the foregoing case 3.1.1.2 is corresponded to. When the UE fails to access or hand over to the candidate cell (referred to as the first candidate cell) that meets the CHO execution condition, if the cell selected by the UE by performing cell selection is a candidate cell (where the cell is the first cell), but the UE fails to access or hand over to the first cell, the case 1.2.1.2 is corresponded to.

In the scenario 3, an NR system is used as an example for specific description, and the UE may record one or more of the following in a corresponding variable or information element:

(1) Related information corresponding when the UE fails to access or hand over to the selected first cell, which, for example, may include one or more of the following: identification information of the first cell, index information corresponding to the first cell, CHO configuration information corresponding to the first cell, signal quality corresponding to the first cell when the UE fails to access or hand over to the first cell, a failure cause value (where the failure cause value may be newly defined, for example, the cause value is "the cell meets a cell selection criterion (or meets an S criterion) but the access or handover fails", or an existing cause value, for example, "HOF", is reused, which is not limited), indication information for indicating that the cell meets the cell selection criterion (or meets the S criterion) but the access or handover fails, or signal quality corresponding to other candidate cells (that is, some or all candidate cells other than the first cell in the at least one candidate cell) when the UE fails to access or hand over to the first cell.

(2) Related information corresponding to the source cell, where for details, refer to (2) in the foregoing scenario 1, and details are not described again.

(3) Optionally, when the conventional handover fails, the UE may further record related information corresponding when the conventional handover fails. For details, refer to (3) in the foregoing scenario 1. Details are not described again.

(4) Optionally, when the UE fails to access or hand over to the first candidate cell, the UE may further record related information corresponding when the UE fails to access or hand over to the first candidate cell. For details, refer to (4) in the foregoing scenario 1. Details are not described again.

(5) Related information corresponding when the re-establishment procedure is initiated (where the UE initiates the re-establishment procedure when the UE fails to access or hand over to the determined first cell), which for example, may include one or more of the following: cell identification information of the re-establishment cell, signal quality corresponding to the re-establishment cell when the re-establishment procedure is performed, a re-establishment cause value (where the cause value may be newly defined, for example, the cause value is "access or handover to the CHO candidate cell that meets the cell selection criterion (or meets the S criterion) fails", or an existing cause value, for example, "HOF", is reused, which is not limited), or indication information for indicating that the UE fails to access or hand over to the first cell that meets the cell selection criterion (or meets the S criterion).

(6) Signal quality corresponding to some or all candidate cells in the at least one candidate cell when a measurement report is reported, signal quality corresponding to some or all candidate cells in the at least one candidate cell when the UE determines the first cell, signal quality corresponding to some or all candidate cells in the at least one candidate cell when the UE initiates the re-establishment procedure, signal quality corresponding to some or all candidate cells in the at least one candidate cell when the UE receives the RRC message (for example, the RRC reconfiguration message or the RRC connection reconfiguration message) including the conditional handover configuration information, or signal quality corresponding to some or all candidate cells in the at least one candidate cell when the re-establishment procedure succeeds.

(7) Time Information.

For example, when an RLF occurs in the source cell, the UE may record one or more of the following information: a time period 1, where the time period 1 is a time period from a time point at which the UE receives the RRC reconfiguration message to a time point at which the radio link failure occurs in the source cell, a time period 2, where the time period 2 is a time period from the time point at which the radio link failure occurs in the source cell to a time point at which the UE determines the first cell, a time period 3, where the time period 3 is a time period from the time point at which the UE determines the first cell to a time point at which the UE fails to access or hand over to the first cell, a time period 4, where the time period 4 is a time period from the time point at which the UE fails to access or hand over to the first cell to a time point at which the UE determines the re-establishment cell, a time period 5, where the time period 5 is a time period from the time point at which the UE determines the re-establishment cell to a time point at which the UE reports the time period 5, or a time period including any two or more consecutive time periods in the time period 1 to the time period 5. For example, the time period 1 and the time period 2 may form a new time period. For another example, the time period 1 to the time period 3 may form a new time period. Examples are not given one by one.

It should be noted that the time point at which the radio link failure occurs in the source cell may be the same as or different from the time point at which the UE determines the first cell. When the two time points are the same, the time period 2 is "o" or the UE does not need to record the time period 2. In this case, the time period 1 may be replaced with "the time period 1 is a time period from a time point at which the UE receives the RRC reconfiguration message to a time point at which the UE determines the first cell", and the time period 3 may be replaced with "the time period 3 is a time period from a time point at which the radio link failure occurs in the source cell to a time point at which the UE fails to access or hand over to the first cell".

It should be noted that the time point at which the UE fails to access or hand over to the first cell may be the same as or different from the time point at which the UE determines the re-establishment cell. When the two time points are the same, the time period 4 is "o" or the UE does not need to record the time period 4. In this case, the time period 3 may be replaced with "the time period 3 is a time period from the time point at which the UE determines the first cell to the time point at which the UE determines the re-establishment cell", and the time period 5 may be replaced with "the time period 5 is a time period from the time point at which the UE fails to access or hand over to the first cell to the time point at which the UE reports the time period 5".

It should be noted that, during specific implementation, the time period 1 to the time period 5 or a time period obtained based on the time period 1 to the time period 5 may be one or more of the following time periods recorded when the RLF occurs in the source cell: the time period 1, the time period 2, the time period 3, the time period 4, and a time period obtained based on any two or more consecutive time periods in the time period 1 to the time period 4, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 5 (for example, when the UE successfully performs re-establishment or RRC establishment in the scenario 3, for example, when the UE sends the RRC re-establishment complete message to the re-establishment cell or the UE sends an RRC establishment complete message to a cell in an RRC establishment process), the UE records the time period 5, a time period including the time period 4 and the time period 5, and/or a time period obtained by combining the time period 5 with a new time period including a time period X to the time period 4, where X is any value from 1 to 3. For example, the time period may be recorded in another variable or information element, where the variable or information element may be newly defined or an existing variable or information element such as timeSinceFailure may be reused. This is not limited.

For another example, when the conventional handover failure occurs, the UE may record one or more of the following information, including a time period 6, where the time period 6 is a time period from a time point at which the UE receives the RRC reconfiguration message to a time point at which the UE receives a conventional handover message, a time period 7, where the time period 7 is a time period from the time point at which the UE receives the conventional handover message to a time point at which the conventional handover fails, a time period 8, where the time period 8 is a time period from the time point at which the conventional handover fails to a time point at which the UE determines the first cell, a time period 9, where the time period 9 is a time period from the time point at which the UE determines the first cell to a time point at which the UE fails to access or hand over to the first cell, a time period 10, where the time period 10 is a time period from the time point at which the UE fails to access or hand over to the first cell to a time point at which the UE determines the re-establishment cell, a time period 11, where the time period 11 is a time period from the time point at which the UE determines the re-establishment cell to a time point at which the UE reports the time period 11, or a time period including any two or more consecutive time periods in the time period 6 to the time period 11.

It should be noted that the time point at which the conventional handover fails may be the same as or different from the time point at which the UE determines the first cell. When the two time points are the same, the time period 8 is "o" or the UE does not need to record the time period 8. In this case, the time period 7 may be replaced with "the time period 7 is a time period from the time point at which the UE receives the conventional handover message to a time point at which the UE determines the first cell", and the time period 9 may be replaced with "the time period 9 is a time period from the time point at which the conventional handover fails to a time point at which the UE fails to access or hand over to the first cell".

It should be noted that the time point at which the UE fails to access or hand over to the first cell may be the same as or different from the time point at which the UE determines the re-establishment cell. When the two time points are the same, the time period 10 is "o" or the UE does not need to record the time period 10. In this case, the time period 9 may be replaced with "the time period 9 is a time period from the time point at which the UE determines the first cell to the time point at which the UE determines the re-establishment cell", and the time period 10 may be replaced with "the time period 10 is a time period from the time point at which the UE fails to access or hand over to the first cell to the time point at which the UE reports the time period 10".

It should be noted that, during specific implementation, the time period 6 to the time period 11 or a time period obtained based on the time period 6 to the time period 11 may be one or more of the following time periods recorded when the conventional handover fails: the time period 6, the time period 7, the time period 8, the time period 9, the time period 10, and a time period obtained based on any two or more consecutive time periods in the time period 6 to the time period 10, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 11 (when the UE successfully performs re-establishment or RRC establishment in the scenario 3, for example, when the UE sends the RRC re-establishment complete message to the re-establishment cell or the UE sends an RRC establishment complete message to a cell in an RRC establishment process), the UE records the time period 11, a time period including the time period 10 and the time period 11, and/or a time period obtained by combining the time period 11 with a new time period including a time period X to the time period 10, where X is any value from 6 to 9. For example, the time period may be recorded in another variable or information element, where the variable or information element may be newly defined or an existing variable or information element such as timeSinceFailure may be reused. This is not limited.

For another example, when the UE fails to access or hand over to the first candidate cell that meets the CHO execution condition, the UE may record one or more of the following information: a time period 12, where the time period 12 is a time period from a time point at which the UE receives the RRC reconfiguration message to a time point at which the UE determines the first candidate cell that meets the conditional handover execution condition, a time period 13, where the time period 13 is a time period from the time point at which the UE determines the first candidate cell that meets the conditional handover execution condition to a time point at which the UE fails to access or hand over to the first candidate cell, a time period 14, where the time period 14 is a time period from the time point at which the UE fails to access or hand over to the first candidate cell to a time point at which the UE determines the first cell, a time period 15, where the time period 15 is a time period from the time point at which the UE determines the first cell to a time point at which the UE fails to access or hand over to the first cell, a time period 16, where the time period 16 is a time period from the time point at which the UE fails to access or hand over to the first cell to a time point at which the UE determines the re-establishment cell, a time period 17, where the time period 17 is a time period from the time point at which the UE determines the re-establishment cell to a time point at which the UE reports the time period 17, or a time period including any two or more consecutive time periods in the time period 12 to the time period 17.

It should be noted that the time point at which the UE fails to access the first candidate cell may be the same as or different from the time point at which the UE determines the first cell. When the two time points are the same, the time period 14 is "o" or the UE does not need to record the time period 14. In this case, the time period 13 may be replaced with "the time period 13 is a time period from the time point at which the UE determines the first candidate cell that meets the conditional handover execution condition to the time point at which the UE determines the first cell", and the time period 15 may be replaced with "the time period 15 is a time period from the time point at which the UE fails to access the first candidate cell to the time point at which the UE fails to access the first cell".

It should be noted that the time point at which the UE fails to access or hand over to the first cell may be the same as or different from the time point at which the UE determines the re-establishment cell. When the two time points are the same, the time period 16 is "o" or the UE does not need to record the time period 16. In this case, the time period 15 may be replaced with "the time period 15 is a time period from the time point at which the UE determines the first cell to the time point at which the UE determines the re-establishment cell", and the time period 17 may be replaced with "the time period 17 is a time period from the time point at which the UE fails to access or hand over to the first cell to the time point at which the UE reports the time period 17".

It should be noted that, during specific implementation, the time period 12 to the time period 17 or a time period obtained based on the time period 12 to the time period 17 may be one or more of the following time periods recorded when the UE fails to access or hand over to the candidate cell (namely, the first candidate cell) that meets the CHO execution condition: the time period 12, the time period 13, the time period 14, the time period 15, the time period 16, and a time period obtained based on any two or more consecutive time periods in the time period 12 to the time period 16, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 17 (when the UE successfully performs re-establishment or RRC establishment in the scenario 3, for example, when the UE sends the RRC re-establishment complete message to the re-establishment cell or the UE sends an RRC establishment complete message to a cell in an RRC establishment process), the UE records the time period 17, a time period including the time period 16 and the time period 17, and/or a time period obtained by combining the time period 17 with a new time period including a time period X to the time period 16, where X is any value from 12 to 15. For example, the time period may be recorded in another variable or information element, where the variable or information element may be newly defined or an existing variable or information element such as timeSinceFailure may be reused. This is not limited.

In the scenario 3, if the re-establishment succeeds, the UE includes indication information in the RRC re-establishment complete message sent to the re-establishment cell (or the network device to which the re-establishment cell belongs). The indication information is used to indicate that the UE records one or more of the foregoing information (1) to (7). If the re-establishment fails, the UE includes indication information in the RRC establishment complete message sent to the cell (or the network device to which the cell belongs) in the RRC establishment process. The indication information is used to indicate that the UE records one or more of the foregoing information (1) to (7).

Scenario 4: When an RLF occurs in a source cell of the UE, conventional handover fails, or the UE fails to access or hand over to a candidate cell (referred to as a first candidate cell) that meets a CHO execution condition, if a cell selected by the UE by performing cell selection is not a candidate cell, the UE performs an RRC re-establishment procedure. Specifically, the UE may succeed in re-establishment or fail in re-establishment. If the re-establishment fails, the UE enters an idle state, and the UE performs an RRC establishment procedure.

When the RLF occurs in the source cell of the UE, if the cell selected by the UE by performing cell selection is not a candidate cell, the case 2.2 is corresponded to.

When the conventional handover fails, if the cell selected by the UE by performing cell selection is not a candidate cell, the case 3.1.2 is corresponded to.

When the UE fails to access or hand over to the candidate cell (referred to as the first candidate cell) that meets the CHO execution condition, if the cell (where for example, the cell is a second cell) selected by the UE by performing cell selection is not a candidate cell, the case 1.2.2 is corresponded to.

In the scenario 4, an NR system is used as an example for specific description, and the UE may record one or more of the following in a corresponding variable or information element:

(1) Related information corresponding when the UE initiates the re-establishment procedure, which, for example, may include one or more of the following: cell identification information of a re-establishment cell (namely, the cell selected by the UE by performing cell selection), signal quality corresponding to the re-establishment cell when the re-establishment procedure is performed, a re-establishment cause value (where the cause value may be newly defined, for example, the cause value is "the cell selected by the UE by performing cell selection meets a cell selection criterion (or meets an S criterion) but does not belong to the at least one candidate cell", or an existing cause value is reused, which is not limited), indication information for indicating that the cell selected by the UE by performing cell selection meets the cell selection criterion (or meets the S criterion) but does not belong to the at least one candidate cell, or signal quality corresponding to some or all candidate cells in the at least one candidate cell when the UE performs the re-establishment procedure.

For (2) to (4), refer to (2) to (4) in the foregoing scenario 3, and details are not described again.

(5) Signal quality corresponding to some or all candidate cells in the at least one candidate cell when a measurement report is reported, signal quality corresponding to some or all candidate cells in the at least one candidate cell when the UE receives the RRC message (for example, an RRC reconfiguration message or an RRC connection reconfiguration message), signal quality corresponding to some or all candidate cells in the at least one candidate cell when RRC re-establishment fails, signal quality corresponding to some or all candidate cells in the at least one candidate cell when an RRC establishment procedure succeeds, or signal quality corresponding to some or all candidate cells in the at least one candidate cell when the RRC re-establishment succeeds.

(6) Time Information

For example, when an RLF occurs in the source cell, the UE may record one or more of the following information: a time period 1, where the time period 1 is a time period from a time point at which the UE receives the RRC reconfiguration message to a time point at which the radio link failure occurs in the source cell, a time period 2, where the time period 2 is a time period from the time point at which the radio link failure occurs in the source cell to a time point at which the UE determines the second cell, and "the UE determines the second cell" may be replaced with "the UE performs re-establishment", that is, the time period 2 may be a time period from the time point at which the radio link failure occurs in the source cell to the time point at which the UE performs re-establishment, a time period 3, where the time period 3 is a time period from the time point at which the UE determines the second cell to a time point at which the UE reports the time period 3, and "the UE determines the second cell" may be replaced with "the UE performs re-establishment", that is, the time period 3 may be a time period from the time point at which the UE performs re-establishment to the time point at which the UE reports the time period 3, or a time period including any two or more consecutive time periods in the time period 1 to the time period 3. For example, the time period 1 and the time period 2 may form a new time period. For another example, the time period 1 to the time period 3 may form a new time period. Examples are not given one by one.

It should be noted that the time point at which the radio link failure occurs in the source cell may be the same as or different from the time point at which the UE determines the second cell. When the two time points are the same, the time period 2 is "o" or the UE does not need to record the time period 2. In this case, the time period 1 may be replaced with "the time period 1 is a time period from a time point at which the UE receives the RRC reconfiguration message to a time point at which the UE determines the second cell", and the time period 3 may be replaced with "the time period 3 is a time period from a time point at which the radio link failure occurs in the source cell to a time point at which the UE reports the time period 3".

It should be noted that, during specific implementation, the time period 1 to the time period 3 or a time period obtained based on the time period 1 to the time period 3 may be one or more of the following time periods recorded when the RLF occurs in the source cell: the time period 1, the time period 2, and a time period obtained based on the time period 1 and the time period 2, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 3 (for example, when the UE successfully performs re-establishment or RRC establishment in the scenario 4, for example, when the UE sends the RRC re-establishment complete message to the re-establishment cell or the UE sends an RRC establishment complete message to a cell in an RRC establishment process), the UE records the time period 3, a time period including the time period 2 and the time period 3, and/or a time period including the time period 1, the time period 2, and the time period 3. For example, the time period may be recorded in another variable or information element, where the variable or information element may be newly defined or an existing variable or information element such as timeSinceFailure may be reused. This is not limited.

For another example, when the conventional handover failure occurs, the UE may record one or more of the following information: a time period 4, where the time period 4 is a time period from a time point at which the UE receives the RRC reconfiguration message to a time point at which the UE receives a conventional handover message, a time period 5, where the time period 5 is a time period from the time point at which the UE receives the conventional handover message to a time point at which the conventional handover fails, a time period 6, where the time period 6 is a time period from the time point at which the conventional handover fails to a time point at which the UE determines the second cell, and "the UE determines the second cell" may be replaced with "the UE performs re-establishment", that is, the time period 6 may be the time point at which the conventional handover fails to a time point at which the UE performs re-establishment, a time period 7, where the time period 7 is a time period from the time point at which the UE determines the second cell to a time point at which the UE reports the time period 7, and "the UE determines the second cell" may be replaced with "the UE performs re-establishment", that is, the time period 7 may be a time period from the time point at which the UE performs re-establishment to the time point at which the UE reports the time period 7, or a time period including any two or more consecutive time periods in the time period 4 to the time period 7.

It should be noted that the time point at which the conventional handover fails may be the same as or different from the time point at which the UE determines the second cell. When the two time points are the same, the time period 6 is "o" or the UE does not need to record the time period 6. In this case, the time period 5 may be replaced with "the time period 5 is a time period from the time point at which the UE receives the conventional handover message to a time point at which the UE determines the second cell", and the time period 7 may be replaced with "the time period 7 is a time period from the time point at which the conventional handover fails to the time point at which the UE reports the time period 7".

It should be noted that, during specific implementation, the time period 4 to the time period 7 or a time period obtained based on the time period 4 to the time period 7 may be one or more of the following time periods recorded when the conventional handover fails: the time period 4, the time period 5, the time period 6, and a time period obtained based on any two or more consecutive time periods in the time period 4 to the time period 6, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 7 (when the UE successfully performs re-establishment or RRC establishment in the scenario 4, for example, when the UE sends the RRC re-establishment complete message to the re-establishment cell or the UE sends an RRC establishment complete message to a cell in an RRC establishment process), the UE records the time period 7, a time period including the time period 6 and the time period 7, and/or a time period obtained by combining the time period 7 with a new time period including a time period X to the time period 6, where X is either 4 or 5. For example, the time period may be recorded in another variable or information element, where the variable or information element may be newly defined or an existing variable or information element such as timeSinceFailure may be reused. This is not limited.

For another example, when the UE fails to access or hand over to the first candidate cell that meets the CHO execution condition, the UE may record one or more of the following information: a time period 8, where the time period 8 is a time period from a time point at which the UE receives the RRC reconfiguration message to a time point at which the UE determines the first candidate cell that meets the conditional handover execution condition, a time period 9, where the time period 9 is a time period from the time point at which the UE determines the first candidate cell that meets the conditional handover execution condition to a time point at which the UE fails to hand over to or access the first candidate cell, a time period 10, where the time period 10 is a time period from the time point at which the UE fails to hand over to or access the first candidate cell to a time point at which the UE determines the second cell, and "the UE determines the second cell" may be replaced with "the UE performs re-establishment", that is, the time period 10 may be a time period from the time point at which the UE fails to hand over to or access the first candidate cell to the time point at which the UE performs re-establishment, a time period 11, where the time period 11 is a time period from the time point at which the UE determines the second cell to a time point at which the UE reports the time period 11, and "the UE determines the second cell" may be replaced with "the UE performs re-establishment", that is, the time period 11 may be a time period from the time point at which the UE performs re-establishment to the time point at which the UE reports the time period 11, or a time period including any two or more consecutive time periods in the time period 8 to the time period 11.

It should be noted that the time point at which the UE fails to hand over to or access the first candidate cell may be the same as or different from the time point at which the UE determines the second cell. When the two time points are the same, the time period 10 is "O" or the UE does not need to record the time period 10. In this case, the time period 9 may be replaced with "the time period 9 is a time period from the time point at which the UE determines the first candidate cell that meets the conditional handover execution condition to the time point at which the UE determines the second cell", and the time period 11 may be replaced with "the time period 11 is a time period from the time point at which the UE fails to hand over to or access the first candidate cell to the time point at which the UE reports the time period 11".

It should be noted that, during specific implementation, the time period 8 to the time period 11 or a time period obtained based on the time period 8 to the time period 11 may be one or more of the following time periods recorded when the UE fails to access or hand over to the candidate cell (namely, the first candidate cell) that meets the CHO execution condition: the time period 8, the time period 9, the time period 10, and a time period obtained based on any two or more consecutive time periods in the time period 8 to the time period 10, which, for example, may be recorded in a same variable or information element. The variable or information element may be newly defined or an existing variable or information element such as timeConnFailure may be reused. This is not limited. When the request sent by the network device for reporting the recorded information (for example, the first indication information described in the embodiment corresponding to FIG. 2, or the second indication information described in the embodiment corresponding to FIG. 2) is received, or when the UE needs to report a time period 11 (when the UE successfully performs re-establishment or RRC establishment in the scenario 4, for example, when the UE sends the RRC re-establishment complete message to the re-establishment cell or the UE sends an RRC establishment complete message to a cell in an RRC establishment process), the UE records the time period 11, a time period including the time period 10 and the time period 11, and/or a time period obtained by combining the time period 11 with a new time period including a time period X to the time period 10, where X is either 8 or 9. For example, the time period may be recorded in another variable or information element, where the variable or information element may be newly defined or an existing variable or information element such as timeSinceFailure may be reused. This is not limited.

In the scenario 4, if the re-establishment succeeds, the UE includes indication information in the RRC re-establishment complete message sent to the re-establishment cell (or the network device to which the re-establishment cell belongs). The indication information is used to indicate that the UE records one or more of the foregoing information (1) to (6). If the re-establishment fails, the UE includes indication information in the RRC establishment complete message sent to the cell (or the network device to which the cell belongs) in the RRC establishment process. The indication information is used to indicate that the UE records one or more of the foregoing information (1) to (6).

The foregoing solution provides related information that can be recorded by the UE in different scenarios of the CHO mechanism, to facilitate subsequently reporting of the related information, so that the network device can adjust a parameter based on the related information reported by the UE, thereby improving system reliability and robustness.

Figure 2:
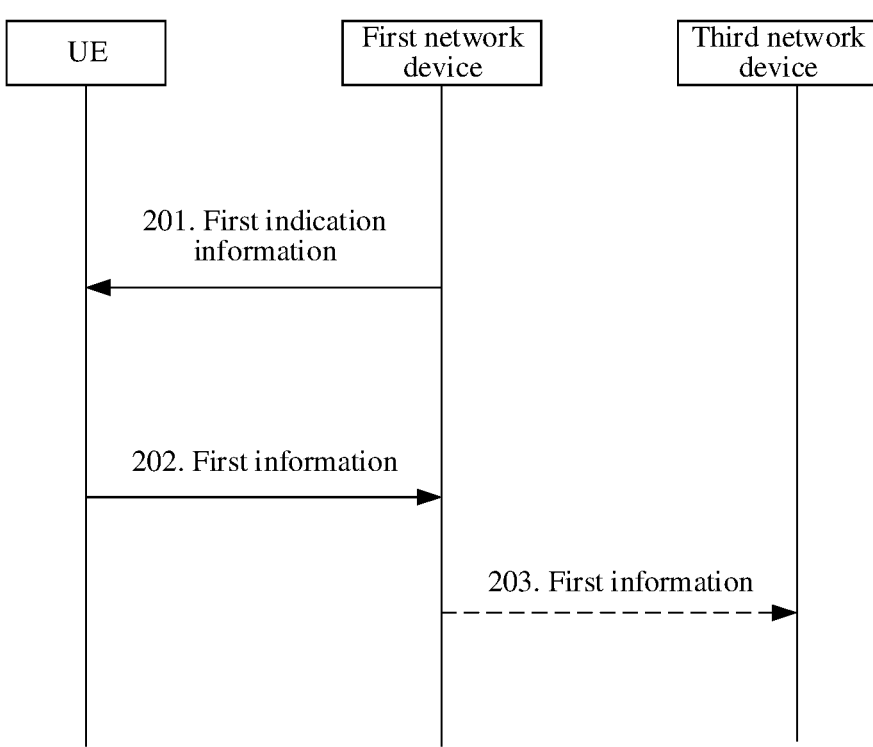
FIG. 2 is a schematic flowchart of a communication method according to this application.

Based on the network architecture shown in FIG. 1, as shown in FIG. 2, this application provides a communication method, in which UE can report related information in a CHO procedure to a network device based on a request of the network device. On a terminal device side, the method may be performed by a terminal device or a component (such as a chip or a circuit) used in the terminal device. On a network side, the method may be performed by a network device or a component (such as a chip or a circuit) used in the network device. For ease of description, an example in which the terminal device and the network device perform the method is used below for description, and an example in which the terminal device is UE is used for description.

The method includes the following steps.

Step 201. A first network device sends first indication information to the UE. Correspondingly, the UE may receive the first indication information.

The first indication information is used to request the UE to report first information. In an example, the first indication information may be a UE information request message. Optionally, the first indication information may include third information and/or fourth information. For example, the third information is used to indicate the UE to report related information in an access/handover failure, and the fourth information is used to indicate the UE to report related information in an access/handover success.

Specifically, in a scenario 1, the first network device may be a network device to which a first cell belongs.

In a scenario 2, the first network device may be a network device to which a first candidate cell belongs.

In a scenario 3, if re-establishment succeeds, the first network device may be a network device to which a re-establishment cell belongs, or if re-establishment fails, the first network device may be a network device to which a cell in an RRC establishment process belongs.

In a scenario 4, if re-establishment succeeds, the first network device may be a network device to which a re-establishment cell belongs, or if re-establishment fails, the first network device may be a network device to which a cell in an RRC establishment process belongs.

Step 202. The UE reports the first information to the first network device.

In the scenario 1, the first information recorded and reported by the UE is a part or all of information described in the foregoing scenario 1. In the scenario 2, the first information recorded and reported by the UE is a part or all of information described in the foregoing scenario 2. In the scenario 3, the first information recorded and reported by the UE is a part or all of information described in the foregoing scenario 3. In the scenario 4, the first information recorded and reported by the UE is a part or all of information described in the foregoing scenario 4.

In the foregoing scenarios, when reporting the first information, the UE may report the first information by using one RRC message (where for example, the message is at a UE granularity), or may report the first information by using a plurality of RRC messages (where for example, the message is at a cell granularity). The RRC message may be a newly defined RRC message, or an existing RRC message (for example, UEInformationResponse) is reused, which is not limited. Optionally, the UE may further report fifth information and/or sixth information. For example, the fifth information is used to indicate that the UE reports the related information in the access/handover failure, and the sixth information is used to indicate that the UE reports the related information in the access/handover success.

Optionally, in addition to the foregoing reporting based on the request of the first network device, the first information may be reported periodically (where a length of a reporting periodicity may be agreed on in a protocol or indicated by a network, for example, an RRC message including CHO configuration information may include the length of the reporting periodicity) or based on an event. For example, the UE reports the first information when the UE successfully accesses or hands over to the first cell, the UE reports the first information when the UE successfully accesses or hands over to the first candidate cell, the UE reports the first information when the UE performs re-establishment, or the UE reports the first information when the UE performs RRC establishment.

Based on the foregoing solution, the UE may report recorded related information in a CHO procedure to the first network device, so that the network device can adjust a handover parameter (for example, conventional handover configuration information or the CHO configuration information) based on the obtained related information, thereby improving system reliability and robustness.

Optionally, the following step 203 may be further included.

Step 203. The first network device sends a part or all of the first information to a third network device.

For ease of description, in the following content, a network device to which a source cell belongs is referred to as a source network device, a network device to which a candidate cell belongs is referred to as a candidate network device, a network device to which a re-establishment cell belongs is referred to as a re-establishment network device, and a network device to which a target cell (herein referred to as a target cell in conventional handover) belongs is referred to as a target network device. The following provides descriptions by using an example in which the source network device, the target network device, the candidate network device, and the re-establishment network device are different from each other. The third network device may include at least one network device. When the third network device includes a plurality of network devices, information sent by the first network device to the plurality of network devices may be the same or different. This is not limited in this embodiment.

Details are as Follows:

In the scenario 1, the first network device may be the network device to which the first cell belongs, and the third network device may be a source network device, a target network device, and/or a candidate network device. For example, in the scenario 1, when an RLF occurs in the source cell, the third network device may be a source network device. When the conventional failure occurs, the third network device may be a target network device and/or a source network device. For example, when the third network device is a source network device, the third network device (namely, the source network device) may further send, to a target network device, a part or all of the information received from the first network device. When the UE fails to access or hand over to a candidate cell (namely, the first candidate cell) that meets a CHO execution condition, the third network device may be a source network device and/or a candidate network device (where for example, the candidate network device may be a network device to which the first candidate cell belongs). When the third network device is a source network device, the third network device (namely, the source network device) may further send a part or all of the information received from the first network device to a candidate network device.

In the scenario 2, the first network device may be the network device to which the first candidate cell belongs, and the third network device may be a source network device and/or a network device to which a candidate cell other than the first candidate cell belongs. For example, in the scenario 2, in an example, when the third network device is a source network device, the third network device (namely, the source network device) may further send a part or all of the information received from the first network device to a network device to which a candidate cell other than the first candidate cell belongs.

In the scenario 3 or the scenario 4, if the re-establishment succeeds, the first network device may be the network device to which the re-establishment cell belongs, and the third network device may be a source network device, a target network device, and/or a candidate network device (where the candidate network device includes a network device to which the first cell belongs and/or a network device to which a candidate cell other than the first cell belongs). Specifically, in the scenario 3 or the scenario 4, when an RLF occurs in the source cell, the third network device may be a source network device and/or a candidate network device (where the candidate network device includes a network device to which the first cell belongs and/or a network device to which a candidate cell other than the first cell belongs). For example, when the third network device is a source network device, the third network device (namely, the source network device) may further send a part or all of the information received from the first network device to a candidate network device (where the candidate network device includes a network device to which the first cell belongs and/or a network device to which a candidate cell other than the first cell belongs). When a conventional failure occurs, the third network device may be a target network device, a source network device, and/or a candidate network device (where the candidate network device includes a network device to which the first cell belongs and/or a network device to which a candidate cell other than the first cell belongs). For example, when the third network device is a source network device, the third network device (namely, the source network device) may further send a part or all of the information received from the first network device to a target network device, and/or the third network device (namely, the source network device) may further send a part or all of the information received from the first network device to a candidate network device. (where the candidate network device includes a network device to which the first cell belongs and/or a network device to which a candidate cell other than the first cell belongs). When the UE fails to access or hand over to a candidate cell (namely, the first candidate cell) that meets a CHO execution condition, the third network device may be a source network device and/or a candidate network device (where for example, the candidate network device may be a network device to which the first candidate cell belongs, a network device to which the first cell belongs, and/or a network device to which a candidate cell other than the first cell or the first candidate cell belongs). For example, when the third network device is a source network device, the third network device (namely, the source network device) may further send a part or all of the information received from the first network device to a candidate network device (where for example, the candidate network device may be a network device to which the first candidate cell belongs, a network device to which the first cell belongs, and/or a network device to which a candidate cell other than the first cell or the first candidate cell belongs).

In the scenario 3 or the scenario 4, if the re-establishment fails, the first network device may be the network device to which the cell in the RRC establishment process belongs, and the third network device may be a source network device, a target network device, a candidate network device (where the candidate network device includes a network device to which the first cell belongs and/or a network device to which a candidate cell other than the first cell belongs), and/or a re-establishment network device. For example, in the scenario 3 or the scenario 4, when an RLF occurs in the source cell, the third network device may be a source network device, a candidate network device (where the candidate network device includes a network device to which the first cell belongs and/or a network device to which a candidate cell other than the first cell belongs), and/or a re-establishment network device. For example, when the third network device is a source network device, the third network device (namely, the source network device) may further send a part or all of the information received from the first network device to a candidate network device (where the candidate network device includes a network device to which the first cell belongs and/or a network device to which a candidate cell other than the first cell belongs), and/or the third network device (namely, the source network device) may send a part or all of the information received from the first network device to the re-establishment network device. When a conventional failure occurs, the third network device may be a target network device, a source network device, a candidate network device (where the candidate network device includes a network device to which the first cell belongs and/or a network device to which a candidate cell other than the first cell belongs), and/or a re-establishment network device. For example, when the third network device is a source network device, the third network device (namely, the source network device) may further send a part or all of the information received from the first network device to a target network device, the third network device (namely, the source network device) may further send a part or all of the information received from the first network device to a candidate network device (where the candidate network device includes a network device to which the first cell belongs and/or a network device to which a candidate cell other than the first cell belongs), and/or the third network device (namely, the source network device) may further send a part or all of the information received from the first network device to a re-establishment network device. When the UE fails to access or hand over to a candidate cell (namely, the first candidate cell) that meets a CHO execution condition, the third network device may be a source network device, a candidate network device (where for example, the candidate network device may be a network device to which the first candidate cell belongs, a network device to which the first cell belongs, and/or a network device to which a candidate cell other than the first cell or the first candidate cell belongs), and/or a re-establishment network device. For example, when the third network device is a source network device, the third network device (namely, the source network device) may further send a part or all of the information received from the first network device to a candidate network device (where for example, the candidate network device may be a network device to which the first candidate cell belongs, a network device to which the first cell belongs, and/or a network device to which a candidate cell other than the first cell or the first candidate cell belongs), and/or the third network device (namely, the source network device) may further send a part or all of the information received from the first network device to a re-establishment network device.

The first network device and/or the third network device may adjust a parameter (for example, conventional handover configuration information or CHO configuration information) based on the received related information, to improve system reliability and robustness. For example, CHO configuration information corresponding to each of at least one candidate cell may be adjusted, a cell may not be configured as a candidate cell in a subsequent CHO procedure, or a cell may not be configured as a target cell in a subsequent conventional handover procedure.

In an implementation method, before step 201, the UE may further receive second indication information from a second network device, where the second indication information is used to indicate the UE to record a part or all of the first information. The second network device may be a source network device. For example, the second indication information may include a plurality of pieces of indication information. For example, the second indication information may include indication information for indicating the UE to record the related information in the access/handover failure, and/or indication information for indicating the UE to record the related information in the access/handover success.

In an implementation method, before step 201, after the UE completes recording a part or all of the first information, the UE may further send third indication information to the first network device, where the third indication information is used to indicate that the UE has completed recording the part or all of the first information. For example, the third indication information may include a plurality of pieces of indication information. For example, the third indication information may include indication information for indicating that the UE has completed recording the related information in the access/handover failure, and/or indication information for indicating that the UE has completed recording the related information in the access/handover success. For example, the third indication information may be included in an RRC establishment complete message, an RRC resume complete message, an RRC re-establishment complete message, an RRC reconfiguration complete message, or another message. This is not limited herein. Optionally, the UE may further send the third indication information to the second network device.

In an implementation method, before step 201, the method may further include: The first network device receives the first indication information from another network device (where the another network device may be one of a source network device, a target network device, a candidate network device, a re-establishment network device, or a network device to which a cell in an RRC establishment process belongs, and the another network device is different from the first network device). For example, if the first network device is a network device to which the first candidate cell belongs, and the another network device is a source network device, the source network device may include the first indication information in a handover request message sent to the network device to which the first candidate cell belongs. Then, the network device to which the first candidate cell belongs includes the first indication information in a handover request acknowledgment message sent to the source network device, and the source network device includes the first indication information in an RRC reconfiguration message that includes the CHO configuration information and that is sent to the UE. The first indication information may be a binary value, a Boolean value, or an information element. This is not limited in this embodiment.

In an example, in any one of the foregoing embodiments of this application, for the scenario 1 or the scenario 2, the second indication information may be included in an RRC reconfiguration message (where the RRC reconfiguration message may be the RRC message including the CHO configuration information, or an RRC message (that is, a handover message) used for conventional handover). The UE may include the recorded related information (that is, a part or all of the first information in the foregoing scenario 1 or scenario 2) in the corresponding scenario in an RRC reconfiguration complete message sent to a network device (that is, the first network device, where for example, in the scenario 1, the first network device is the network device to which the first cell belongs, and in the scenario 2, the first network device is the network device to which the first candidate cell belongs) to which a cell that the UE successfully accesses belongs. Optionally, the RRC reconfiguration complete message may further include the third indication information.

In an example, in any one of the foregoing embodiments of this application, for the scenario 3 or the scenario 4, the second indication information may be included in an RRC reconfiguration message (where the RRC reconfiguration message may be the RRC message including the CHO configuration information, or an RRC message (that is, a handover message) used for conventional handover). In the scenario 3 or the scenario 4, if the re-establishment succeeds, the first network device may be the network device to which the re-establishment cell belongs, and the UE may include, in an RRC re-establishment complete message sent to the network device to which the re-establishment cell belongs, recorded related information in a corresponding scenario (that is, a part or all of the first information in the scenario 3 or the scenario 4). Optionally, the RRC re-establishment complete message may further include the third indication information. If the re-establishment fails, the first network device may be a network device to which a cell in an RRC establishment process belongs, and the UE may include, in the RRC establishment complete message sent to the network device to which the cell in the RRC establishment process belongs, the recorded related information in the corresponding scenario (that is, a part or all of the first information in the scenario 3 or the scenario 4). Optionally, the RRC establishment complete message may further include the third indication information.

In the foregoing embodiment of this application, the UE may record and report the related information generated in the conditional handover procedure, and the following beneficial effects are achieved:

It should be noted that a meaning of the following character "/" is "and/or". For example, recording/reporting includes the following meanings: recording, reporting, or recording and reporting. A unified description is provided herein, and details are not described below again.

For the Scenario 1:

(1) If related information corresponding to successful access or handover to the first cell is recorded/reported, a network device (for example, the candidate network device, the target network device, or the source network device) may learn, based on the received information, that signal quality of the first cell is good, and the first cell is a cell that meets a cell selection criterion (or meets an S criterion) and that the UE can successfully access or hand over to.

(2) If related information corresponding to the source cell is recorded/reported, the first network device may subsequently send, based on identification information of the source cell, a part or all of the related information reported by the UE to the source network device. In addition, a network device (for example, the candidate network device, the target network device, or the source network device) learns that the first cell is a cell that meets a cell selection criterion (or meets an S criterion) and that the UE can successfully access or hand over to. If a failure cause value (where for example, the cause value is "the RLF occurs in the source cell") and/or indication information for indicating that the RLF occurs in the source cell are/is recorded/reported, a network device (for example, the candidate network device, the target network device, or the source network device) may learn that the RLF occurs in the source cell in the CHO procedure.

(3) If identification information of the target cell is recorded/reported, the first network device or the source network device may subsequently send, to the target network device based on the identification information of the target cell, a part or all of the related information reported by the UE. The network device (for example, the candidate network device, the target network device, or the source network device) may learn, based on signal quality corresponding to the target cell, a failure cause value (where for example, the cause value is "HOF" or "T304 expires"), or indication information for indicating that the conventional handover fails (or T304 expires), that the conventional handover procedure is triggered in the CHO procedure but the conventional handover fails.

(4) If related information corresponding when the UE fails to access or hand over to the first candidate cell is recorded/reported, the first network device learns that quality of the first candidate cell is poor, based on identification information of the first candidate cell, index information corresponding to the first candidate cell, CHO configuration information corresponding to the first candidate cell, and signal quality corresponding to the first candidate cell when the UE fails to access or hand over to the first candidate cell, and subsequently, the first network device or the source network device may send, to the candidate network device, a part or all of the related information reported by the UE.

Based on a failure cause value (where for example, the cause value is "the CHO execution condition is met but the UE fails to perform access or handover"), indication information for indicating that the first candidate cell meets the CHO execution condition but the UE fails to perform access or handover, a success cause value (where for example, the cause value is "the first cell meets a cell selection criterion (or meets an S criterion) and access or handover succeeds"), or indication information for indicating that the first cell meets the cell selection criterion (or meets the S criterion) and the access or handover succeeds, a network device (for example, the candidate network device or the source network device) may learn that the UE fails to hand over to the first candidate cell in the CHO procedure.

In addition, based on identification information of the first cell and identification information of a candidate cell, because the cell selected by the UE by performing cell selection is a candidate cell, the first network device may consider that a failure in handing over to the first candidate cell by the UE is incorrect handover (or it may be understood as that a candidate cell configured in the CHO procedure is inappropriate, for example, CHO configuration information (for example, CHO execution condition information) of the candidate cell is inappropriate, or a cell should not be configured as a candidate cell in the CHO procedure).

(5) If signal quality corresponding to some or all of candidate cells in the at least one candidate cell at each moment is recorded/reported, a network device (for example, the candidate network device, the target network device, or the source network device) may learn of cells with good signal quality and cells with poor signal quality at each moment.

(6) If time information is recorded/reported, a network device (for example, the candidate network device, the target network device, or the source network device) may adjust a related parameter at an appropriate time point based on the time information.

For the Scenario 2:

(1) If related information corresponding to successful access or handover to the first candidate cell is recorded/reported, a network device (for example, the candidate network device, the target network device, or the source network device) learns, based on the received information, that signal quality of the first candidate cell is good, and the CHO procedure succeeds.

(2) For other information, refer to the descriptions of the beneficial effects in the scenario 1.

For the Scenario 3:

(1) If related information corresponding when the UE fails to access or hand over to the selected first cell is recorded/reported, a network device (for example, the candidate network device, the target network device, or the source network device) may learn, based on identification information of the first cell, index information corresponding to the first cell, CHO configuration information corresponding to the first cell, and signal quality corresponding to the first cell when the UE fails to access or hand over to the first cell, that signal quality of the first cell is not ideal.

Based on a failure cause value (where for example, the cause value is "the cell meets a cell selection criterion (or meets an S criterion), but access or handover fails", or an existing cause value (for example, "HOF") is reused, which is not limited), indication information for indicating that the cell meets a cell selection criterion (or meets an S criterion) but access or handover fails, a failure cause value (where for example, the cause value is "an CHO execution condition is met but the UE fails to perform access or handover"), or indication information for indicating that the first candidate cell meets the CHO execution condition but the UE fails to perform access or handover, a network device (for example, the candidate network device, the target network device, or the source network device) may learn that the CHO procedure fails (or it may be understood as that the UE fails to hand over to the first candidate cell or the first cell in the CHO procedure).

In addition, based on identification information of the first cell and identification information of the source cell, because the cell selected by the UE by performing cell selection is a candidate cell, a network device (for example, the candidate network device, the target network device, or the source network device) may consider the failed handover of the UE to the first candidate cell as incorrect handover (or it may be understood as that a candidate cell configured in the CHO procedure is inappropriate, for example, CHO configuration information (for example, CHO execution condition information) of the candidate cell is inappropriate, or a cell should not be configured as a candidate cell in the CHO procedure).

(2) If related information corresponding to the re-establishment procedure is recorded/reported, a network device (for example, the candidate network device, the target network device, the source network device, or the re-establishment network device) may learn, based on a re-establishment cause value and indication information for indicating that the UE fails to access or hand over to the first cell that meets a cell selection criterion (or meets an S criterion), that the CHO procedure fails (or it may be understood as that the UE fails to hand over to the first candidate cell or the first cell in the CHO procedure), or the network device may consider the handover in the scenario 3 as incorrect handover or premature handover (or it may be understood as that a candidate cell configured in the CHO procedure is inappropriate, for example, CHO configuration information (for example, CHO execution condition information) of the candidate cell is inappropriate, or a cell should not be configured as a candidate cell in the CHO procedure).

Based on identification information of the source cell and identification information of a re-establishment cell, if the re-establishment cell in which the UE performs re-establishment is the source cell, a network device may consider the handover in the scenario 3 as premature handover. If a cell in which the UE performs re-establishment is a cell other than the source cell, the first network device may consider the handover in the scenario 3 as incorrect handover (or it may be understood as that a candidate cell configured in the CHO procedure is inappropriate, for example, CHO configuration information (for example, CHO execution condition information) of the candidate cell is inappropriate, or a cell should not be configured as a candidate cell in the CHO procedure).

(2) For other information, refer to the descriptions of the beneficial effects in the scenario 1.

For the Scenario 4:

(1) If related information corresponding to the re-establishment procedure is recorded/reported, a network device (for example, the candidate network device, the target network device, the source network device, or the re-establishment network device) may learn, based on a re-establishment cause value, indication information for indicating that a cell selected by the UE by performing cell selection meets a cell selection criterion (or meets an S criterion) but does not belong to the at least one candidate cell, that the CHO procedure fails (or it may be understood as that the UE fails to hand over to the first candidate cell in the CHO procedure), or the network device (for example, the candidate network device, the target network device, the source network device, or the re-establishment network device) may consider the handover in scenario 4 as incorrect handover or premature handover (or it may be understood as that a candidate cell configured in the CHO procedure is inappropriate, for example, CHO configuration information (for example, CHO execution condition information) of the candidate cell is inappropriate, or a cell should not be configured as a candidate cell in the CHO procedure).

In addition, based on identification information of the at least one candidate cell and identification information of the source cell, if the UE selects the source cell by performing cell selection, a network device (for example, the candidate network device, the target network device, the source network device, or the re-establishment network device) may consider the failed handover of the UE to the first candidate cell as premature handover. If a cell other than the source cell and the candidate cell is selected by performing cell selection, the network device (for example, the candidate network device, the target network device, the source network device, or the re-establishment network device) may consider the failed handover of the UE to the first candidate cell as incorrect handover (or it may be understood as that a candidate cell configured in the CHO procedure is inappropriate, for example, CHO configuration information (for example, CHO execution condition information) of the candidate cell is inappropriate, or a cell should not be configured as a candidate cell in the CHO procedure).

(2) For other information, refer to the descriptions of the beneficial effects in the scenario 1.

The solutions provided in this application are described above mainly from a perspective of interaction between network elements. It may be understood that, the network elements include corresponding hardware structures and/or software modules for performing the foregoing functions. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

It may be understood that, in the foregoing method embodiments, the corresponding steps and operations implemented by the terminal device may alternatively be implemented by a component (for example, a chip or a circuit) that can be disposed in the terminal device, and the steps and the operations implemented by the network device may alternatively be implemented by a component (for example, a chip or a circuit) that can be disposed in the network device.

An embodiment of this application further provides an apparatus configured to implement any one of the foregoing methods. For example, this embodiment of this application provides an apparatus including units (or means) that are used to implement the steps performed by the terminal device in any one of the foregoing methods. The apparatus includes a unit (or means) configured to implement each step performed by the network device in any one of the foregoing methods.

Figure 3:
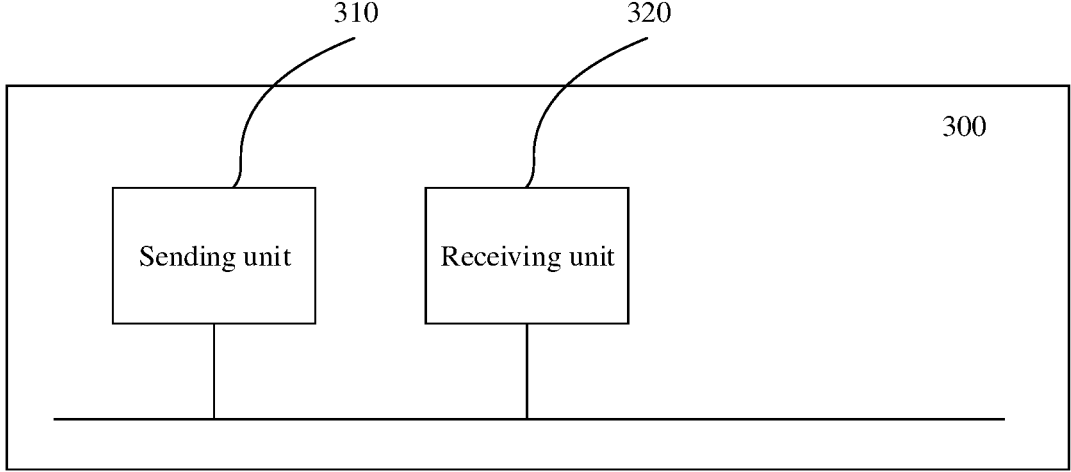
FIG. 3 is a schematic diagram of a communication apparatus according to this application.

For example, FIG. 3 is a schematic diagram of a communication apparatus according to an embodiment of this application. The apparatus is configured to implement the steps performed by the corresponding terminal device in the foregoing method embodiments. As shown in FIG. 3, the apparatus 300 includes a sending unit 310 and a receiving unit 320. The apparatus may be a terminal device, or may be a component (for example, a chip or a circuit) that can be disposed in the terminal device. The apparatus may include one or more of the following possible implementations.

In a First Possible Implementation:

The receiving unit 320 is configured to receive first indication information from a first network device, where the first indication information is used to request a terminal device to report first information. The sending unit 310 is configured to report the first information to the first network device. When a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device successfully accesses the first cell, the first information includes one or more of the following: identification information of the first cell, index information corresponding to the first cell, signal quality corresponding to the first cell when the terminal device successfully accesses the first cell, a success cause value, or indication information for indicating that the first cell meets a cell selection criterion and the access succeeds. The first cell belongs to the first network device, the at least one candidate cell is indicated by an RRC reconfiguration message from a second network device, the second network device is a network device to which the source cell belongs, and the first candidate cell is one of the at least one candidate cell.

In a possible implementation method, when the radio link failure occurs in the source cell of the terminal device, the conventional handover fails, or the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: signal quality corresponding to some or all candidate cells in the at least one candidate cell when the terminal device determines the first cell, or signal quality corresponding to some or all candidate cells other than the first cell in the at least one candidate cell when the terminal device successfully accesses the first cell.

In a possible implementation method, when the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: signal quality corresponding to some or all candidate cells in the at least one candidate cell when the conditional handover execution condition corresponding to the first candidate cell is met, or signal quality corresponding to some or all candidate cells in the at least one candidate cell when the terminal device fails to access the first candidate cell.

In a possible implementation method, when the radio link failure occurs in the source cell of the terminal device, the first cell selected by the terminal device by performing cell selection belongs to the at least one candidate cell, and the terminal device successfully accesses the first cell, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines the first cell, a time period 3, where the time period 3 is a time period from the time point at which the terminal device determines the first cell to a time point at which the terminal device successfully accesses the first cell, a time period 4, where the time period 4 is a time period from the time point at which the terminal device successfully accesses the first cell to a time point at which the terminal device reports the time period 4, or a time period including any two or more consecutive time periods in the time period 1 to the time period 4.

In a possible implementation method, when the conventional handover fails, the first cell selected by the terminal device by performing cell selection belongs to the at least one candidate cell, and the terminal device successfully accesses the first cell, the first information further includes one or more of the following: a time period 5, where the time period 5 is a time period from a time point at which the terminal device receives the RRC reconfiguration message to a time point at which the terminal device receives a conventional handover message, a time period 6, where the time period 6 is a time period from the time point at which the terminal device receives the conventional handover message to a time point at which the conventional handover fails, a time period 7, where the time period 7 is a time period from the time point at which the conventional handover fails to a time point at which the terminal device determines the first cell, a time period 8, where the time period 8 is a time period from the time point at which the terminal device determines the first cell to a time point at which the terminal device successfully accesses the first cell, a time period 9, where the time period 9 is a time period from the time point at which the terminal device successfully accesses the first cell to a time point at which the terminal device reports the time period 9, or a time period including any two or more consecutive time periods in the time period 5 to the time period 9.

In a possible implementation method, when the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: a time period 10, where the time period 10 is a time period from a time point at which the terminal device receives the RRC reconfiguration message to a time point at which the terminal device determines the first candidate cell that meets the conditional handover execution condition, a time period 11, where the time period 11 is a time period from the time point at which the terminal device determines the first candidate cell that meets the conditional handover execution condition to a time point at which the terminal device fails to access the first candidate cell, a time period 12, where the time period 12 is a time period from the time point at which the terminal device fails to access the first candidate cell to a time point at which the terminal device determines the first cell, a time period 13, where the time period 13 is a time period from the time point at which the terminal device determines the first cell to a time point at which the terminal device successfully accesses the first cell, a time period 14, where the time period 14 is a time period from the time point at which the terminal device successfully accesses the first cell to a time point at which the terminal device reports the time period 14, or a time period including any two or more consecutive time periods in the time period 10 to the time period 14.

In a possible implementation method, the receiving unit 320 is further configured to: before receiving the first indication information, receive indication information for indicating to record the first information.

In a possible implementation method, the sending unit 310 is further configured to: before the receiving unit 320 receives the first indication information, send, to the first network device, indication information for indicating that the first information has been recorded.

In a Second Possible Implementation:

The receiving unit 320 is configured to receive first indication information from a first network device, where the first indication information is used to request a terminal device to report first information. The sending unit 310 is configured to report the first information to the first network device. When a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device fails to access the first cell, the first information includes one or more of the following: identification information of the first cell, index information corresponding to the first cell, conditional handover configuration information corresponding to the first cell, signal quality corresponding to the first cell when the terminal device fails to access the first cell, a failure cause value, or indication information for indicating that the first cell meets a cell selection criterion and the access fails.

The first network device is a network device to which a re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

In a possible implementation method, when the radio link failure occurs in the source cell of the terminal device, the conventional handover fails, or the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: signal quality corresponding to some or all candidate cells in the at least one candidate cell when the terminal device determines the first cell, signal quality corresponding to some or all candidate cells other than the first cell in the at least one candidate cell when the terminal device fails to access the first cell, or signal quality corresponding to some or all candidate cells other than the first cell in the at least one candidate cell when the terminal device performs a re-establishment procedure.

In a possible implementation method, when the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: signal quality corresponding to some or all candidate cells in the at least one candidate cell when the conditional handover execution condition corresponding to the first candidate cell is met, or signal quality corresponding to some or all candidate cells in the at least one candidate cell when the terminal device fails to access the first candidate cell.

In a possible implementation method, when the radio link failure occurs in the source cell of the terminal device, the first cell selected by the terminal device by performing cell selection belongs to the at least one candidate cell, and the terminal device fails to access the first cell, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines the first cell, a time period 3, where the time period 3 is a time period from the time point at which the terminal device determines the first cell to a time point at which the terminal device fails to access the first cell, a time period 4, where the time period 4 is a time period from the time point at which the terminal device fails to access the first cell to a time point at which the terminal device determines the re-establishment cell, a time period 5, where the time period 5 is a time period from the time point at which the terminal device determines the re-establishment cell to a time point at which the terminal device reports the time period 5, or a time period including any two or more consecutive time periods in the time period 1 to the time period 5.

In a possible implementation method, when the conventional handover fails, the first cell selected by the terminal device by performing cell selection belongs to the at least one candidate cell, and the terminal device fails to access the first cell, the first information further includes one or more of the following: a time period 6, where the time period 6 is a time period from a time point at which the terminal device receives the RRC reconfiguration message to a time point at which the terminal device receives a conventional handover message, a time period 7, where the time period 7 is a time period from the time point at which the terminal device receives the conventional handover message to a time point at which the conventional handover fails, a time period 8, where the time period 8 is a time period from the time point at which the conventional handover fails to a time point at which the terminal device determines the first cell, a time period 9, where the time period 9 is a time period from the time point at which the terminal device determines the first cell to a time point at which the terminal device fails to access the first cell, a time period 10, where the time period 10 is a time period from the time point at which the terminal device fails to access the first cell to a time point at which the terminal device determines the re-establishment cell, a time period 11, where the time period 11 is a time period from the time point at which the terminal device determines the re-establishment cell to a time point at which the terminal device reports the time period 11, or a time period including any two or more consecutive time periods in the time period 6 to the time period 11.

In a possible implementation method, when the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: a time period 12, where the time period 12 is a time period from a time point at which the terminal device receives the RRC reconfiguration message to a time point at which the terminal device determines the first candidate cell that meets the conditional handover execution condition, a time period 13, where the time period 13 is a time period from the time point at which the terminal device determines the first candidate cell that meets the conditional handover execution condition to a time point at which the terminal device fails to access the first candidate cell, a time period 14, where the time period 14 is a time period from the time point at which the terminal device fails to access the first candidate cell to a time point at which the terminal device determines the first cell, a time period 15, where the time period 15 is a time period from the time point at which the terminal device determines the first cell to a time point at which the terminal device fails to access the first cell, a time period 16, where the time period 16 is a time period from the time point at which the terminal device fails to access the first cell to a time point at which the terminal device determines the re-establishment cell, a time period 17 where the time period 17 is a time period from the time point at which the terminal device determines the re-establishment cell to a time point at which the terminal device reports the time period 17, or a time period including any two or more consecutive time periods in the time period 12 to the time period 17.

In a possible implementation method, before the receiving first indication information from a first network device, the receiving unit 320 is further configured to: receive indication information for indicating to record the first information.

In a possible implementation method, the sending unit 310 is further configured to: before the receiving unit 320 receives the first indication information, send, to the first network device, indication information for indicating that the first information has been recorded.

It may be understood that the foregoing units may also be referred to as modules, circuits, or the like, and the foregoing units may be independently disposed, or may be completely or partially integrated.

In some possible implementations, the sending unit 310 and the receiving unit 320 may alternatively be implemented by a transceiver unit, or the sending unit 310 and the receiving unit 320 may be collectively referred to as a transceiver unit. The sending unit 310 and the receiving unit 320 or the transceiver unit may also be referred to as a communication interface.

Optionally, the communication apparatus 300 may further include a storage unit. The storage unit is configured to store data or instructions (which may also be referred to as code or a program). The foregoing units may interact with or be coupled to the storage unit, to implement a corresponding method or function.

Figure 4:
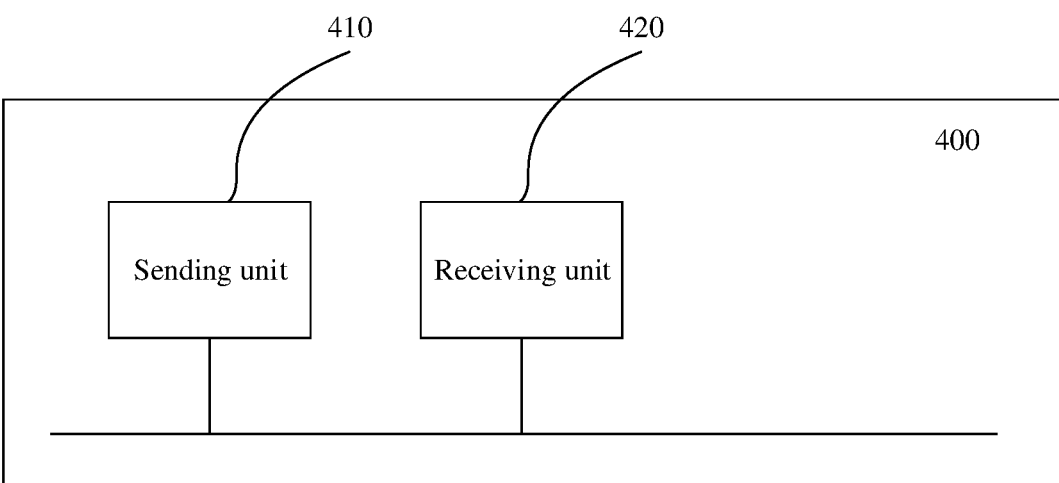
FIG. 4 is a schematic diagram of another communication apparatus according to this application.

For example, FIG. 4 is a schematic diagram of a communication apparatus according to an embodiment of this application. The apparatus is configured to implement the steps performed by the corresponding network device in the foregoing method embodiments. As shown in FIG. 4, the apparatus 400 includes a sending unit 410 and a receiving unit 420. The apparatus may be a network device, or may be a component (for example, a chip or a circuit) that can be disposed in the network device. The apparatus may include one or more of the following possible implementations. In a first possible implementation:

The sending unit 410 is configured to send first indication information to a terminal device, where the first indication information is used to request the terminal device to report first information. The receiving unit 420 is configured to receive the first information from the terminal device. When a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device successfully accesses the first cell, the first information includes one or more of the following: identification information of the first cell, index information corresponding to the first cell, signal quality corresponding to the first cell when the terminal device successfully accesses the first cell, a success cause value, or indication information for indicating that the first cell meets a cell selection criterion and the access succeeds. The first cell belongs to the first network device, the at least one candidate cell is indicated by an RRC reconfiguration message from a second network device, the second network device is a network device to which the source cell belongs, and the first candidate cell is one of the at least one candidate cell.

In a possible implementation method, when the radio link failure occurs in the source cell of the terminal device, the conventional handover fails, or the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: signal quality corresponding to some or all candidate cells in the at least one candidate cell when the terminal device determines the first cell, or signal quality corresponding to some or all candidate cells other than the first cell in the at least one candidate cell when the terminal device successfully accesses the first cell.

In a possible implementation method, when the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: signal quality corresponding to some or all candidate cells in the at least one candidate cell when the conditional handover execution condition corresponding to the first candidate cell is met, or signal quality corresponding to some or all candidate cells in the at least one candidate cell when the terminal device fails to access the first candidate cell.

In a possible implementation method, when the radio link failure occurs in the source cell of the terminal device, the first cell selected by the terminal device by performing cell selection belongs to the at least one candidate cell, and the terminal device successfully accesses the first cell, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines the first cell, a time period 3, where the time period 3 is a time period from the time point at which the terminal device determines the first cell to a time point at which the terminal device successfully accesses the first cell, a time period 4, where the time period 4 is a time period from the time point at which the terminal device successfully accesses the first cell to a time point at which the terminal device reports the time period 4, or a time period including any two or more consecutive time periods in the time period 1 to the time period 4.

In a possible implementation method, when the conventional handover fails, the first cell selected by the terminal device by performing cell selection belongs to the at least one candidate cell, and the terminal device successfully accesses the first cell, the first information further includes one or more of the following: a time period 5, where the time period 5 is a time period from a time point at which the terminal device receives the RRC reconfiguration message to a time point at which the terminal device receives a conventional handover message, a time period 6, where the time period 6 is a time period from the time point at which the terminal device receives the conventional handover message to a time point at which the conventional handover fails, a time period 7, where the time period 7 is a time period from the time point at which the conventional handover fails to a time point at which the terminal device determines the first cell, a time period 8, where the time period 8 is a time period from the time point at which the terminal device determines the first cell to a time point at which the terminal device successfully accesses the first cell, a time period 9, where the time period 9 is a time period from the time point at which the terminal device successfully accesses the first cell to a time point at which the terminal device reports the time period 9, or a time period including any two or more consecutive time periods in the time period 5 to the time period 9.

In a possible implementation method, when the terminal device fails to access the first candidate cell that meets the conditional handover execution condition, the first cell selected by the terminal device by performing cell selection belongs to the at least one candidate cell, and the terminal device successfully accesses the first cell, the first information further includes one or more of the following: a time period 10, where the time period 10 is a time period from a time point at which the terminal device receives the RRC reconfiguration message to a time point at which the terminal device determines the first candidate cell that meets the conditional handover execution condition, a time period 11, where the time period 11 is a time period from the time point at which the terminal device determines the first candidate cell that meets the conditional handover execution condition to a time point at which the terminal device fails to access the first candidate cell, a time period 12, where the time period 12 is a time period from the time point at which the terminal device fails to access the first candidate cell to a time point at which the terminal device determines the first cell, a time period 13, where the time period 13 is a time period from the time point at which the terminal device determines the first cell to a time point at which the terminal device successfully accesses the first cell, a time period 14, where the time period 14 is a time period from the time point at which the terminal device successfully accesses the first cell to a time point at which the terminal device reports the time period 14, or a time period including any two or more consecutive time periods in the time period 10 to the time period 14.

In a possible implementation method, the receiving unit 420 is further configured to: before the sending unit sends the first indication information to the terminal device, receive, from the terminal device, indication information for indicating that the recording of the first information has been completed.

In a Second Possible Implementation:

The sending unit 410 is configured to send first indication information to a terminal device, where the first indication information is used to request the terminal device to report first information. The receiving unit 420 is configured to receive the first information from the terminal device. When a radio link failure occurs in a source cell of the terminal device, conventional handover fails, or the terminal device fails to access a first candidate cell that meets a conditional handover execution condition, a first cell selected by the terminal device by performing cell selection belongs to at least one candidate cell, and the terminal device fails to access the first cell, the first information includes one or more of the following: identification information of the first cell, index information corresponding to the first cell, conditional handover configuration information corresponding to the first cell, signal quality corresponding to the first cell when the terminal device fails to access the first cell, a failure cause value, or indication information for indicating that the first cell meets a cell selection criterion and the access fails. The first network device is a network device to which a re-establishment cell belongs or a network device to which a cell in an RRC establishment process belongs, the at least one candidate cell is indicated by an RRC reconfiguration message from a second network device, the second network device is a network device to which the source cell belongs, and the first candidate cell is one of the at least one candidate cell.

In a possible implementation method, when the radio link failure occurs in the source cell of the terminal device, the conventional handover fails, or the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: signal quality corresponding to some or all candidate cells in the at least one candidate cell when the terminal device determines the first cell, signal quality corresponding to some or all candidate cells other than the first cell in the at least one candidate cell when the terminal device fails to access the first cell, or signal quality corresponding to some or all candidate cells other than the first cell in the at least one candidate cell when the terminal device performs a re-establishment procedure.

In a possible implementation method, when the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: signal quality corresponding to some or all candidate cells in the at least one candidate cell when the conditional handover execution condition corresponding to the first candidate cell is met, or signal quality corresponding to some or all candidate cells in the at least one candidate cell when the terminal device fails to access the first candidate cell.

In a possible implementation method, when the radio link failure occurs in the source cell of the terminal device, the first cell selected by the terminal device by performing cell selection belongs to the at least one candidate cell, and the terminal device fails to access the first cell, the first information further includes one or more of the following: a time period 1, where the time period 1 is a time period from a time point at which the terminal device receives the RRC reconfiguration message to a time point at which the radio link failure occurs in the source cell, a time period 2, where the time period 2 is a time period from the time point at which the radio link failure occurs in the source cell to a time point at which the terminal device determines the first cell, a time period 3, where the time period 3 is a time period from the time point at which the terminal device determines the first cell to a time point at which the terminal device fails to access the first cell, a time period 4, where the time period 4 is a time period from the time point at which the terminal device fails to access the first cell to a time point at which the terminal device determines the re-establishment cell, time period 5, where the time period 5 is a time period from the time point at which the terminal device determines the re-establishment cell to a time point at which the terminal device reports the time period 5, or a time period including any two or more consecutive time periods in the time period 1 to the time period 5.

In a possible implementation method, when the conventional handover fails, the first cell selected by the terminal device by performing cell selection belongs to the at least one candidate cell, and the terminal device fails to access the first cell, the first information further includes one or more of the following: a time period 6, where the time period 6 is a time period from a time point at which the terminal device receives the RRC reconfiguration message to a time point at which the terminal device receives a conventional handover message, a time period 7, where the time period 7 is a time period from the time point at which the terminal device receives the conventional handover message to a time point at which the conventional handover fails, a time period 8, where the time period 8 is a time period from the time point at which the conventional handover fails to a time point at which the terminal device determines the first cell, a time period 9, where the time period 9 is a time period from the time point at which the terminal device determines the first cell to a time point at which the terminal device fails to access the first cell, a time period 10, where the time period 10 is a time period from the time point at which the terminal device fails to access the first cell to a time point at which the terminal device determines the re-establishment cell, a time period 11, where the time period 11 is a time period from the time point at which the terminal device determines the re-establishment cell to a time point at which the terminal device reports the time period 11, or a time period including any two or more consecutive time periods in the time period 6 to the time period 11.

In a possible implementation method, when the terminal device fails to access the first candidate cell that meets the conditional handover execution condition, the first cell selected by the terminal device by performing cell selection belongs to the at least one candidate cell, and the terminal device fails to access the first cell, the first information further includes one or more of the following: a time period 12, where the time period 12 is a time period from a time point at which the terminal device receives the RRC reconfiguration message to a time point at which the terminal device determines the first candidate cell that meets the conditional handover execution condition, a time period 13, where the time period 13 is a time period from the time point at which the terminal device determines the first candidate cell that meets the conditional handover execution condition to a time point at which the terminal device fails to access the first candidate cell, a time period 14, where the time period 14 is a time period from the time point at which the terminal device fails to access the first candidate cell to a time point at which the terminal device determines the first cell, a time period 15, where the time period 15 is a time period from the time point at which the terminal device determines the first cell to a time point at which the terminal device fails to access the first cell, a time period 16, where the time period 16 is a time period from the time point at which the terminal device fails to access the first cell to a time point at which the terminal device determines the re-establishment cell, a time period 17 where the time period 17 is a time period from the time point at which the terminal device determines the re-establishment cell to a time point at which the terminal device reports the time period 17, or a time period including any two or more consecutive time periods in the time period 12 to the time period 17.

In a possible implementation method, the receiving unit 420 is further configured to: before the sending unit sends the first indication information to the terminal device, receive, from the terminal device, indication information for indicating that the recording of the first information has been completed.

It may be understood that the foregoing units may also be referred to as modules, circuits, or the like, and the foregoing units may be independently disposed, or may be completely or partially integrated.

In some possible implementations, the sending unit 410 and the receiving unit 420 may alternatively be implemented by a transceiver unit, or the sending unit 410 and the receiving unit 420 may be collectively referred to as a transceiver unit. The sending unit 410 and the receiving unit 420 or the transceiver unit may also be referred to as a communication interface.

Optionally, the communication apparatus 400 may further include a storage unit. The storage unit is configured to store data or instructions (which may also be referred to as code or a program). The foregoing units may interact with or be coupled to the storage unit, to implement a corresponding method or function.

It should be understood that division into the units in the foregoing apparatuses is merely logical function division. In an actual implementation, all or some of the units may be integrated into a physical entity, or may be physically separate. In addition, all of the units in the apparatus may be implemented in a form of software invoked by a processing element, or may be implemented in a form of hardware, or some of the units may be implemented in a form of software invoked by a processing element, and some of the units may be implemented in a form of hardware. For example, each unit may be a separately disposed processing element, or may be integrated into a chip in the apparatus. In addition, each unit may be stored as a program in a memory and invoked by a processing element of the apparatus to perform a function of the unit. In addition, these units may be all or partially integrated, or may be implemented independently. The processing element herein may be alternatively a processor, and may be an integrated circuit having a signal processing capability. In an implementation process, the steps in the foregoing methods or the foregoing units may be implemented by using an integrated logic circuit of hardware in the processing element, or implemented in a form of software invoked by the processing element.

For example, a unit in any one of the foregoing apparatuses may be one or more integrated circuits configured to implement the foregoing method, for example, one or more application-specific integrated circuits (Application Specific Integrated Circuits, ASICs), one or more microprocessors (DSPs), one or more field programmable gate arrays (FP- GAs), or a combination of at least two of the integrated circuits. For another example, when the unit in the apparatus may be implemented in a form of a program invoked by a processing element, the processing element may be a general-purpose processor, for example, a central processing unit (CPU) or another processor that can invoke the program. For another example, these units may be integrated together, and implemented in a form of a system-on-a-chip (SOC).

The foregoing unit for receiving (for example, the receiving unit) is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending (for example, the sending unit) is an interface circuit of the apparatus, and is configured to send a signal from another apparatus. For example, when the apparatus is implemented by a chip, the sending unit is an interface circuit that is of the chip and that is configured to send a signal from another chip or apparatus.

An embodiment of this application further provides a communication apparatus, including a unit (or a means) configured to implement each step performed by the terminal device in any one of the foregoing methods or a unit (or a means) configured to implement each step performed by the network device in any one of the foregoing methods. The communication apparatus may include a processor and a memory. The memory is configured to store computer-executable instructions, and when the apparatus runs, the processor executes the computer-executable instructions stored in the memory, so that the apparatus performs the methods in the foregoing aspects. The apparatus may be a network device or a chip used in the network device, or a terminal device or a chip used in the terminal device.

Figure 5:
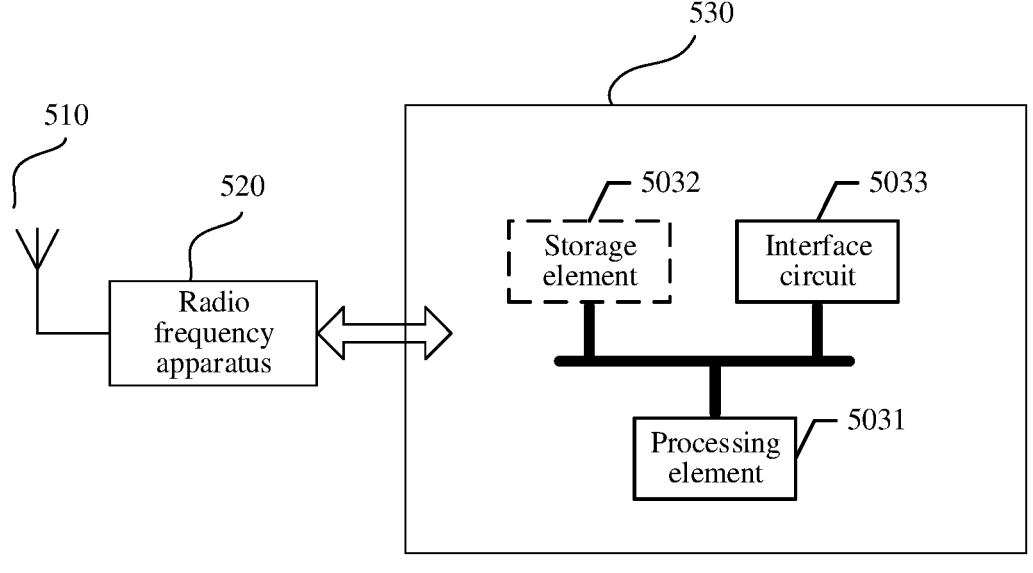
FIG. 5 is a schematic diagram of a terminal device according to this application.

FIG. 5 is a schematic diagram of a structure of a terminal device according to an embodiment of this application. The terminal device is configured to implement operations of the terminal device in the foregoing embodiments. As shown in FIG. 5, the terminal device includes an antenna 510, a radio frequency apparatus 520, and a signal processing part 530. The antenna 510 is connected to the radio frequency apparatus 520. In a downlink direction, the radio frequency apparatus 520 receives, through the antenna 510, information sent by a network device, and sends, to the signal processing part 530 for processing, the information sent by the network device. In an uplink direction, the signal processing part 530 processes information of the terminal device, and sends the information to the radio frequency apparatus 520. The radio frequency apparatus 520 processes the information of the terminal device, and then sends the processed information to the network device through the antenna 510.

The signal processing part 530 is configured to process each communication protocol layer of data. The signal processing part 530 may be a subsystem of the terminal device. The terminal device may further include another subsystem, for example, a central processing subsystem, configured to process an operating system and an application layer of the terminal device, and for another example, a peripheral subsystem, configured to connect to another device. The signal processing part 530 may be a separately disposed chip. Optionally, the foregoing apparatus may be located in the signal processing part 530.

The signal processing part 530 may include one or more processing elements 5031, for example, include a main control CPU and another integrated circuit, and include an interface circuit 5033. In addition, the signal processing part 530 may further include a storage element 5032. The storage element 5032 is configured to store data and a program. The program used to perform the method performed by the terminal device in the foregoing method may be stored or may not be stored in the storage element 5032, for example, stored in a memory outside the signal processing part 530. When used, the signal processing part 530 loads the program into a cache for use. The interface circuit 5033 is configured to communicate with the apparatus. The foregoing apparatus may be located in the signal processing part 530. The signal processing part 530 may be implemented by a chip. The chip includes at least one processing element and an interface circuit. The processing element is configured to perform steps in any method performed by the foregoing terminal device. The interface circuit is configured to communicate with another apparatus. In an implementation, a unit configured to perform each step in the foregoing method may be implemented in a form of a program invoked by a processing element. For example, the apparatus includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the signal processing part 530. The processing element herein may be an integrated circuit, for example, one or more ASICs, one or more DSPs, one or more FPGAs, or a combination of these types of integrated circuits. These integrated circuits may be integrated together to form a chip.

The units configured to implement the steps in the foregoing method may be integrated together and implemented in a form of a system-on-a-chip (system-on-a-chip, SOC). The SOC chip is configured to implement the foregoing method. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus may include at least one processing element and interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element, or may perform some or all steps performed by the terminal device, in a second manner, to be specific, by using a hardware integrated logic circuit in the processor element in combination with instructions, or may certainly perform, by combining the first manner and the second manner, some or all steps performed by the terminal device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be a memory, or a general name of a plurality of storage elements.

Figure 6:
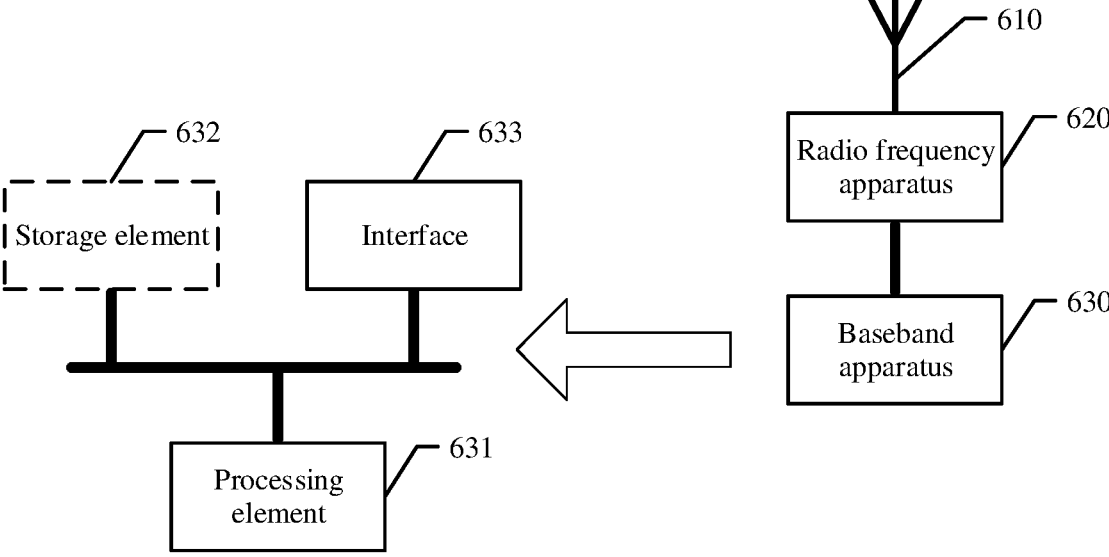
FIG. 6 is a schematic diagram of a network device according to this application.

FIG. 6 is a schematic diagram of a structure of a network device according to an embodiment of this application. The network device is configured to implement operations of the network device in the foregoing embodiments. As shown in FIG. 6, the network device includes an antenna 610, a radio frequency apparatus 620, and a baseband apparatus 630. The antenna 610 is connected to the radio frequency apparatus 620. In an uplink direction, the radio frequency apparatus 620 receives, through the antenna 610, information sent by a terminal device, and sends the information sent by the terminal device, to the baseband apparatus 630 for processing. In a downlink direction, the baseband apparatus 630 processes information from the terminal device and sends processed information to the radio frequency apparatus 620, and the radio frequency apparatus 620 processes the information from the terminal device and then sends processed information to the terminal device through the antenna 610.

The baseband apparatus 630 may include one or more processing elements 631, for example, include a main control CPU and another integrated circuit, and further include an interface 633. In addition, the baseband apparatus 630 may further include a storage element 632. The storage element 632 is configured to store a program and data. The interface circuit 633 is configured to exchange information with the radio frequency apparatus 620, and the interface is, for example, a common public radio interface (common public radio interface, CPRI). The foregoing apparatus used in the network device may be located in the baseband apparatus 630. For example, the foregoing apparatus used in the network device may be a chip in the baseband apparatus 630. The chip includes at least one processing element and an interface circuit. The processing element is configured to perform steps in any method performed by the network device. The interface circuit is configured to communicate with another apparatus. In an implementation, units of the network device that implement the steps in the foregoing methods may be implemented by scheduling a program by a processing element. For example, the apparatuses used in the network device include a processing element and a storage element. The processing element invokes a program stored in the storage element, to perform the method performed by the network device in the foregoing method embodiments. The storage element may be a storage element on the same chip as the processing element, that is, an on-chip storage element, or may be a storage element that is on a different chip from the processing element, that is, an off-chip storage element.

In another implementation, units of the network device that implement the steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated to form a chip.

Units of the network device that implement the steps in the foregoing method may be integrated together, and implemented in a form of a system-on-a-chip (system-on-a-chip, SOC). For example, the baseband apparatus includes the SOC chip, configured to implement the foregoing method. At least one processing element and storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and interface circuit. The at least one processing element is configured to perform any one of the methods that are provided in the foregoing method embodiments and performed by the network device. The processing element may perform some or all steps performed by the network device in a first manner, that is, by invoking the program stored in the storage element, or may perform some or all steps performed by the network device, in a second manner, that is, by using a hardware integrated logic circuit in the processor element in combination with instructions, or may certainly perform, by combining the first manner and the second manner, some or all steps performed by the network device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be a memory, or a general name of a plurality of storage elements.

An embodiment of this application further provides a communication system, including the communication apparatus shown in FIG. 3 and the communication apparatus shown in FIG. 4.

Another embodiment of this application provides a communication system, including the terminal device shown in FIG. 5 and the network device shown in FIG. 6.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid state drive, SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, multiple microprocessors, one or more microprocessors and a digital signal processor core, or any other similar configuration.

In one or more examples of designs, the functions described in this application may be implemented by using hardware, software, firmware, or any combination thereof. If the functions are implemented by software, the functions may be stored in a computer-readable medium, or may be transmitted on a computer-readable medium in a form of one or more instructions or code. The computer-readable medium includes a computer storage medium and a communication medium that enables a computer program to move from one place to another. The storage medium may be an available medium that may be accessed by any general or special computer. For example, such a computer-readable medium may include but is not limited to a random access memory (RAM), read only memory (ROM), electrically erasable programmable read only memory (EEPROM), a compact disc read only memory (CD-ROM) or another optical disc storage, a disk storage or another magnetic storage apparatus, or any other medium that may be used to bear or store program code, where the program code is in a form of instructions or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk (disk) and the disc (disc) include a compressed disk, a laser disk, an optical disc, a digital versatile disc (English: Digital Versatile Disc, DVD for short), a floppy disk, and a Blu-ray disc. The disk generally copies data by a magnetic means, and the disc generally copies data optically by a laser means. The foregoing combination may alternatively be included in the computer-readable medium.

A person skilled in the art should be aware that in the foregoing one or more examples, functions described in this application may be implemented by hardware, software, firmware, or any combination thereof. When implemented by using software, these functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general purpose or dedicated computer.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered to have covered any of or all modifications, variations, combinations or equivalents within the scope of this application. Obviously, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:

receiving first indication information from a first network device, wherein the first indication information requests a terminal device to report first information; and reporting the first information to the first network device, wherein when the terminal device receives conditional handover (CHO) configuration information of at least one candidate cell from a second network device and a radio link failure occurs in a source cell of the terminal device, conventional handover fails, or the terminal device fails to access a first candidate cell that meets a conditional handover execution condition, and a first cell selected by the terminal device by performing cell selection belongs to the at least one candidate cell and the terminal device performs an access or handover to the first cell, the first information comprises identification information of the first cell, wherein the second network device is a network device to which the source cell of the terminal device belongs and the first candidate cell is one of the at least one candidate cell; or when the terminal receives the CHO configuration information of the at least one candidate cell from a second network device and a radio link failure occurs in a source cell of the terminal device, conventional handover fails, or the terminal device fails to access a first candidate cell that meets a conditional handover execution condition, and a first cell selected by performing cell selection does not belong to the at least one candidate cell, and the terminal device performs a re-establishment procedure with the first cell being a re-establishment cell, the first information comprises identification information of the first cell, wherein the second network device is a network device to which the source cell of the terminal device belongs, and wherein the first candidate cell is one of the at least one candidate cell;

wherein in a case of that the radio link failure occurs in the source cell of the terminal device, the first information further comprises one or more of the following:

a time period 1, wherein the time period 1 is a time period from a time point at which the terminal device receives a radio resource control (RRC) reconfiguration message carrying the CHO configuration information to a time point at which the radio link failure occurs in the source cell; or a time period 1' which is from the time point at which the radio link failure occurs in the source cell to a time point at which the terminal device reports the time period 1'; or in a case that the conventional handover fails, the first information further comprises one or more of the following:

a time period 6, wherein the time period 6 is a time period from the time point at which the terminal device receives a conventional handover message to a time point at which the conventional handover fails; or a time period 2' which is from the time point at which the conventional handover fails to a time point at which the terminal device reports the time period 2'; or in a case that the terminal device fails to access the first candidate cell that meets the conditional handover execution condition, the first information further comprises one or more of the following:

a time period 10, wherein the time period 10 is a time period from a time point at which the terminal device receives the RRC reconfiguration message carrying the CHO configuration information to a time point at which the terminal device determines the first candidate cell that meets the conditional handover execution condition;

a time period 3' is from the time period at which the terminal device receives the RRC reconfiguration message carrying the CHO configuration information to the time point at which the terminal device fails to access the first candidate cell; or a time period 4' is from the time period from the time point at which the terminal device fails to access the first candidate cell to a time point at which the terminal device reports the time period 4'.

2. The method according to claim 1, wherein at least one of:

the first information further comprises information indicating a signal quality corresponding to some or all candidate cells in the at least one candidate cell in response to the terminal device determining the first cell; or the first information further comprises information indicating a signal quality corresponding to some or all candidate cells other than the first cell in the at least one candidate cell in response to the terminal device successfully accessing the first cell.

3. The method according to claim 1, wherein at least one of:

the first information further comprises information indicating a signal quality corresponding to some or all candidate cells in the at least one candidate cell in response to the conditional handover execution condition corresponding to the first candidate cell being met; or the first information further comprises information indicating signal quality corresponding to some or all candidate cells in the at least one candidate cell in response to the terminal device failing to access the first candidate cell.

4. The method according to claim 1, wherein in the case that the radio link failure occurs in the source cell of the terminal device, the first information further comprises one or more of the following:

a time period 2, wherein the time period 2 is a time period from the time point at which the radio link failure occurs in the source cell to a time point at which the terminal device determines the first cell;

a time period 3, wherein the time period 3 is a time period from the time point at which the terminal device determines the first cell to a time point at which the terminal device successfully accesses the first cell;

a time period 4, wherein the time period 4 is a time period from the time point at which the terminal device successfully accesses the first cell to a time point at which the terminal device reports the time period 4; or a time period comprising any two or more consecutive time periods in the time period 1 to the time period 4.

5. The method according to claim 1, wherein in the case that the conventional handover fails, the first information further comprises at least one of the following:

a time period 5, wherein the time period 5 is the time period from the time point at which the terminal device receives the RRC reconfiguration message to the time point at which the terminal device receives the conventional handover message;

a time period 7, wherein the time period 7 is from the time point at which the conventional handover fails to a time period at which the terminal device determines the first cell;

a time period 8, wherein the time period 8 is from the time point at which the terminal device determines the first cell to a time period at which the terminal device successfully accesses the first cell;

a time period 9, wherein the time period 9 is from the time point at which the terminal device successfully accesses the first cell to a time period at which the terminal device reports the time period 9; or a time period comprising any two or more consecutive time periods in the time period 5 to the time period 9.

6. The method according to claim 1, wherein in the case that the terminal device fails to access the first candidate cell that meets the conditional handover execution condition, the first information further comprises one or more of the following:

a time period 11, wherein the time period 11 is a time period from the time point at which the terminal device determines the first candidate cell that meets the conditional handover execution condition to a time point at which the terminal device fails to access the first candidate cell; or a time period 12, wherein the time period 12 is from the time point at which the terminal device fails to access the first candidate cell to a time point at which the terminal device determines the first cell;

a time period 13, wherein the time period 13 is from the time point at which the terminal device determines the first cell to a time point at which the terminal device successfully accesses the first cell;

a time period 14, wherein the time period 14 is from the time point at which the terminal device successfully accesses the first cell to a time point at which the terminal device reports the time period 14; or a time period comprising any two or more consecutive time periods in the time period 10 to the time period 14.

7. The method according to claim 1, wherein, before receiving the first indication information from the first network device, the method further comprises:

receiving indication information indicating to record the first information.

8. The method according to claim 1, wherein, before receiving the first indication information from the first network device, the method further comprises:

sending, to the first network device, indication information indicating that recording of the first information has been completed.

9. A communication method, comprising:

sending, by a first network device, first indication information to a terminal device, wherein the first indication information is used to request the terminal device to report first information; and receiving, by the first network device, the first information from the terminal device, wherein when the terminal device receives conditional handover (CHO) configuration information of at least one candidate cell from a second network device and a radio link failure occurs in a source cell of the terminal device, conventional handover fails, or the terminal device fails to access a first candidate cell that meets a conditional handover execution condition, and a first cell selected by the terminal device by performing cell selection belongs to the at least one candidate cell and the terminal device performs an access or handover to the first cell, the first information comprises identification information of the first cell, wherein the second network device is a network device to which the source cell of the terminal device belongs, and the first candidate cell is one of the at least one candidate cell; or when the terminal device receives the CHO configuration information of the at least one candidate cell from a second network device, and a radio link failure occurs in a source cell of the terminal device, conventional handover fails, or the terminal device fails to access a first candidate cell that meets a conditional handover execution condition, and a first cell selected by performing cell selection does not belong to the at least one candidate cell and the terminal device performs a re-establishment procedure with the first cell being a re-establishment cell, the first information comprises identification information of the first cell, wherein the second network device is a network device to which the source cell of the terminal device belongs, and the first candidate cell is one of the at least one candidate cell;

wherein in a case that the radio link failure occurs in the source cell of the terminal device, the first information further comprises one or more of the following:

a time period 1, wherein the time period 1 is a time period from a time point at which the terminal device receives a radio resource control (RRC) reconfiguration message carrying the CHO configuration information to a time point at which the radio link failure occurs in the source cell; or a time period 1' which is from the time point at which the radio link failure occurs in the source cell to a time point at which the terminal device reports the time period 1'; or in a case that the conventional handover fails, the first information further comprises one or more of the following:

a time period 6, wherein the time period 6 is a time period from the time point at which the terminal device receives a conventional handover message to a time point at which the conventional handover fails; or a time period 2' which is from the time point at which the conventional handover fails to a time point at which the terminal device reports the time period 2'; or in a case that the terminal device fails to access the first candidate cell that meets the conditional handover execution condition, the first information further comprises one or more of the following:

a time period 10, wherein the time period 10 is a time period from a time point at which the terminal device receives the RRC reconfiguration message carrying the CHO configuration information to a time point at which the terminal device determines the first candidate cell that meets the conditional handover execution condition;

a time period 3' is from the time point at which the terminal device receives the RRC reconfiguration message carrying the CHO configuration information to the time point at which the terminal device fails to access the first candidate cell; or a time period 4' is from the time period from the time point at which the terminal device fails to access the first candidate cell to a time point at which the terminal device reports the time period 4'.

10. The method according to claim 9, wherein at least one of:

the first information further comprises information indicating a signal quality corresponding to some or all candidate cells in the at least one candidate cell in response to the terminal device determining the first cell; or the first information further comprises information indicating signal quality corresponding to some or all candidate cells other than the first cell in the at least one candidate cell in response to the terminal device successfully accessing the first cell.

11. The method according to claim 9, wherein at least one of:

the first information further comprises information indicating a signal quality corresponding to some or all candidate cells in the at least one candidate cell in response to the conditional handover execution condition corresponding to the first candidate cell being met; or the first information further comprises information indicating a signal quality corresponding to some or all candidate cells in the at least one candidate cell in response to the terminal device failing to access the first candidate cell.

12. The method according to claim 9, wherein in the case that the radio link failure occurs in the source cell of the terminal device, the first information further comprises one or more of the following:

a time period 2, wherein the time period 2 is a time period from the time point at which the radio link failure occurs in the source cell to a time point at which the terminal device determines the first cell;

a time period 3, wherein the time period 3 is a time period from the time point at which the terminal device determines the first cell to a time point at which the terminal device successfully accesses the first cell;

a time period 4, wherein the time period 4 is a time period from the time point at which the terminal device successfully accesses the first cell to a time point at which the terminal device reports the time period 4; or a time period comprising any two or more consecutive time periods in the time period 1 to the time period 4.

13. The method according to claim 9, wherein in the case that the conventional handover fails, the first information further comprises one or more of the following:

a time period 5, wherein the time period 5 is a time period from the time point at which the terminal device receives the RRC reconfiguration message to a time point at which the terminal device receives the conventional handover message;

a time period 7, wherein the time period 7 is from the time point at which the conventional handover fails to a time period at which the terminal device determines the first cell;

a time period 8, wherein the time period 8 is from the time point at which the terminal device determines the first cell to a time period at which the terminal device successfully accesses the first cell;

a time period 9, wherein the time period 9 is from the time point at which the terminal device successfully accesses the first cell to a time period at which the terminal device reports the time period 9; or a time period comprising any two or more consecutive time periods in the time period 5 to the time period 9.

14. The method according to claim 9, wherein in the case that the terminal device fails to access the first candidate cell that meets the conditional handover execution condition, the first information further comprises one or more of the following:

a time period 11, wherein the time period 11 is a time period from the time point at which the terminal device determines the first candidate cell that meets the conditional handover execution condition to a time point at which the terminal device fails to access the first candidate cell; or a time period 12, wherein the time period 12 is from the time point at which the terminal device fails to access the first candidate cell to a time point at which the terminal device determines the first cell;

a time period 13, wherein the time period 13 is from the time point at which the terminal device determines the first cell to a time point at which the terminal device successfully accesses the first cell;

a time period 14, wherein the time period 14 is from the time point at which the terminal device successfully accesses the first cell to a time point at which the terminal device reports the time period 14; or a time period comprising any two or more consecutive time periods in the time period 10 to the time period 14.

15. The method according to claim 9, wherein before sending the first indication information to the terminal device, the method further comprises:

receiving, from the terminal device, indication information indicating that recording of the first information has been completed.

16. A communication apparatus, comprising a processor and an interface circuit, wherein the interface circuit is configured to communicate with a second apparatus, and wherein the processor is configured to perform steps for:

receiving first indication information from a first network device, wherein the first indication information requests a terminal device to report first information; and reporting the first information to the first network device, wherein when the terminal device receives conditional handover (CHO) configuration information of at least one candidate cell from a second network device and a radio link failure occurs in a source cell of the terminal device, conventional handover fails, or the terminal device fails to access a first candidate cell that meets a conditional handover execution condition, and a the first cell selected by the terminal device by performing cell selection belongs to the at least one candidate cell and the terminal device performs an access or handover to the first cell, the first information comprises identification information of the first cell, wherein the second network device is a network device to which the source cell of the terminal device belongs and the first candidate cell is one of the at least one candidate cell; or when the terminal receives the CHO configuration information of the at least one candidate cell from a second network device and a radio link failure occurs in a source cell of the terminal device, conventional handover fails, or the terminal device fails to access a first candidate cell that meets a conditional handover execution condition, and a first cell selected by performing cell selection does not belong to the at least one candidate cell, and the terminal device performs a re-establishment procedure with the first cell being a re-establishment cell, the first information comprises identification information of the first cell, wherein the second network device is a network device to which the source cell of the terminal device belongs, and the first candidate cell is one of the at least one candidate cell;

wherein in a case that the radio link failure occurs in the source cell of the terminal device, the first information further comprises one or more of the following:

a time period 1, wherein the time period 1 is a time period from a time point at which the terminal device receives a radio resource control (RRC) reconfiguration message carrying the CHO configuration information to a time point at which the radio link failure occurs in the source cell; or a time period 1' which is from the time point at which the radio link failure occurs in the source cell to a time point at which the terminal device reports the time period 1'; or in a case that the conventional handover fails, the first information further comprises one or more of the following:

a time period 6, wherein the time period 6 is a time period from the time point at which the terminal device receives a conventional handover message to a time point at which the conventional handover fails; or a time period 2' which is from the time point at which the conventional handover fails to a time point at which the terminal device reports the time period 2'; or in a case that the terminal device fails to access the first candidate cell that meets the conditional handover execution condition, the first information further comprises one or more of the following:

a time period 10, wherein the time period 10 is a time period from a time point at which the terminal device receives the RRC reconfiguration message carrying the CHO configuration information to a time point at which the terminal device determines the first candidate cell that meets the conditional handover execution condition;

a time period 3' is from the time period at which the terminal device receives the RRC reconfiguration message carrying the CHO configuration information to the time point at which the terminal device fails to access the first candidate cell; or a time period 4' is from the time period from the time point at which the terminal device fails to access the first candidate cell to a time point at which the terminal device reports the time period 4.

17. The communication apparatus according to claim 16, wherein at least one of:

the first information further comprises information indicating a signal quality corresponding to some or all candidate cells in the at least one candidate cell in response to the terminal device determining the first cell; or the first information further comprises information indicating a signal quality corresponding to some or all candidate cells other than the first cell in the at least one candidate cell in response to the terminal device successfully accessing the first cell.

18. The communication apparatus according to claim 16, wherein at least one of:

the first information further comprises information indicating signal quality corresponding to some or all candidate cells in the at least one candidate cell in response to the conditional handover execution condition corresponding to the first candidate cell being met; or the first information further comprises information indicating signal quality corresponding to some or all candidate cells in the at least one candidate cell in response to the terminal device failing to access the first candidate cell.

19. The communication apparatus according to claim 16, wherein in the case that the radio link failure occurs in the source cell of the terminal device, the first information further comprises one or more of the following:

a time period 2, wherein the time period 2 is a time period from the time point at which the radio link failure occurs in the source cell to a time point at which the terminal device determines the first cell;

a time period 3, wherein the time period 3 is a time period from the time point at which the terminal device determines the first cell to a time point at which the terminal device successfully accesses the first cell;

a time period 4, wherein the time period 4 is a time period from the time point at which the terminal device successfully accesses the first cell to a time point at which the terminal device reports the time period 4; or a time period comprising any two or more consecutive time periods in the time period 1 to the time period 4; or in the case that the conventional handover fails, the first information further comprises one or more of the following:

a time period 5, wherein the time period 5 is a time period from a time point at which the terminal device receives the RRC reconfiguration message to a time point at which the terminal device receives the conventional handover message;

a time period 7, wherein the time period 7 is from the time point at which the conventional handover fails to a time period at which the terminal device determines the first cell;

a time period 8, wherein the time period 8 is from the time point at which the terminal device determines the first cell to a time period at which the terminal device successfully accesses the first cell;

a time period 9, wherein the time period 9 is from the time point at which the terminal device successfully accesses the first cell to a time period at which the terminal device reports the time period 9; or a time period comprising any two or more consecutive time periods in the time period 5 to the time period 9; or in the case that the terminal device fails to access the first candidate cell that meets the conditional handover execution condition, the first information further comprises one or more of the following:

a time period 11, wherein the time period 11 is a time period from the time point at which the terminal device determines the first candidate cell that meets the conditional handover execution condition to a time point at which the terminal device fails to access the first candidate cell;

a time period 12, wherein the time period 12 is from the time point at which the terminal device fails to access the first candidate cell to a time point at which the terminal device determines the first cell;

a time period 13, wherein the time period 13 is from the time point at which the terminal device determines the first cell to a time point at which the terminal device successfully accesses the first cell;

a time period 14, wherein the time period 14 is from the time point at which the terminal device successfully accesses the first cell to a time point at which the terminal device reports the time period 14; or a time period comprising any two or more consecutive time periods in the time period 10 to the time period 14.

20. The apparatus according to claim 16, wherein the processor is further configured to perform steps for:

sending, to the first network device, before receiving first indication information from the first network device, indication information indicating that recording of the first information has been completed.

21. A communication apparatus, being a first network device or a chipset for the first network device and comprising a processor and an interface circuit, wherein the interface circuit communicates with a second apparatus, and the processor is configured to perform steps for:

sending first indication information to a terminal device, wherein the first indication information requests the terminal device to report first information; and receiving the first information from the terminal device;

wherein when the terminal device receives conditional handover (CHO) configuration information of at least one candidate cell from a second network device and a radio link failure occurs in a source cell of the terminal device, conventional handover fails, or the terminal device fails to access a first candidate cell that meets a conditional handover execution condition, and a first cell selected by the terminal device by performing cell selection belongs to the at least one candidate cell and the terminal device performs an access or handover to the first cell, the first information comprises identification information of the first cell, wherein the second network device is a network device to which the source cell of the terminal device belongs and the first candidate cell is one of the at least one candidate cell; or when the terminal receives the CHO configuration information of the at least one candidate cell from a second network device, and a radio link failure occurs in a source cell of the terminal device, conventional handover fails, or the terminal device fails to access a first candidate cell that meets a conditional handover execution condition, and a first cell selected by performing cell selection does not belong to the at least one candidate cell, and the terminal device performs a re-establishment procedure with the first cell being a re-establishment cell, the first information comprises identification information of the first cell, wherein the second network device is a network device to which the source cell of the terminal device belongs, and the first candidate cell is one of the at least one candidate cell;

wherein in a case that the radio link failure occurs in the source cell of the terminal device, the first information further comprises one or more of the following:

a time period 1, wherein the time period 1 is a time period from a time point at which the terminal device receives a radio resource control (RRC) reconfiguration message carrying the CHO configuration information to a time point at which the radio link failure occurs in the source cell; or a time period 1' which is from the time point at which the radio link failure occurs in the source cell to a time point at which the terminal device reports the time period 1'; or in a case that the conventional handover fails, the first information further comprises one or more of the following:

a time period 6, wherein the time period 6 is a time period from the time point at which the terminal device receives a conventional handover message to a time point at which the conventional handover fails; or a time period 2' which is from the time point at which the conventional handover fails to a time point at which the terminal device reports the time period 2'; or in a case that the terminal device fails to access the first candidate cell that meets the conditional handover execution condition, the first information further comprises one or more of the following:

a time period 10, wherein the time period 10 is a time period from a time point at which the terminal device receives the RRC reconfiguration message carrying the CHO configuration information to a time point at which the terminal device determines the first candidate cell that meets the conditional handover execution condition;

a time period 3' is from the time period at which the terminal device receives the RRC reconfiguration message carrying the CHO configuration information to the time point at which the terminal device fails to access the first candidate cell; or a time period 4' is from the time period from the time point at which the terminal device fails to access the first candidate cell to a time point at which the terminal device reports the time period 4'.

22. The communication apparatus according to claim 21, wherein at least one of:

the first information further comprises information indicating a signal quality corresponding to some or all candidate cells in the at least one candidate cell in response to the terminal device determining the first cell; or the first information further comprises information indicating a signal quality corresponding to some or all candidate cells other than the first cell in the at least one candidate cell in response to the terminal device successfully accessing the first cell.

23. The communication apparatus according to claim 21, wherein at least one of:

the first information further comprises information indicating a signal quality corresponding to some or all candidate cells in the at least one candidate cell in response to the conditional handover execution condition corresponding to the first candidate cell being met; or the first information further comprises information indicating a signal quality corresponding to some or all candidate cells in the at least one candidate cell in response to the terminal device failing to access the first candidate cell.

24. The communication apparatus according to claim 21, wherein in the case that the radio link failure occurs in the source cell of the terminal device, the first information further comprises one or more of the following:

a time period 2, wherein the time period 2 is a time period from the time point at which the radio link failure occurs in the source cell to a time point at which the terminal device determines the first cell;

a time period 3, wherein the time period 3 is a time period from the time point at which the terminal device determines the first cell to a time point at which the terminal device successfully accesses the first cell;

a time period 4, wherein the time period 4 is a time period from the time point at which the terminal device successfully accesses the first cell to a time point at which the terminal device reports the time period 4;

a time period comprising any two or more consecutive time periods in the time period 1 to the time period 4; or in the case that the conventional handover fails, the first information further comprises one or more of the following:

a time period 5, wherein the time period 5 is a time period from a time point at which the terminal device receives the RRC reconfiguration message to a time point at which the terminal device receives the conventional handover message;

a time period 7, wherein the time period 7 is from the time point at which the conventional handover fails to a time period at which the terminal device determines the first cell;

a time period 8, wherein the time period 8 is from the time point at which the terminal device determines the first cell to a time period at which the terminal device successfully accesses the first cell;

a time period 9, wherein the time period 9 is from the time point at which the terminal device successfully accesses the first cell to a time period at which the terminal device reports the time period 9; or a time period comprising any two or more consecutive time periods in the time period 5 to the time period 9; or in the case that the terminal device fails to access the first candidate cell that meets the conditional handover execution condition, the first information further comprises one or more of the following:

a time period 11, wherein the time period 11 is a time period from the time point at which the terminal device determines the first candidate cell that meets the conditional handover execution condition to a time point at which the terminal device fails to access the first candidate cell;

a time period 12, wherein the time period 12 is from the time point at which the terminal device fails to access the first candidate cell to a time point at which the terminal device determines the first cell;

a time period 13, wherein the time period 13 is from the time point at which the terminal device determines the first cell to a time point at which the terminal device successfully accesses the first cell;

a time period 14, wherein the time period 14 is from the time point at which the terminal device successfully accesses the first cell to a time point at which the terminal device reports the time period 14; or a time period comprising any two or more consecutive time periods in the time period 10 to the time period 14.

25. The apparatus according to claim 21, wherein the processor is further configured to perform steps for:

receiving, before sending the first indication information to the terminal device, from the terminal device, indication information indicating that recording of the first information has been completed.

\*   \*   \*   \*   \*